US011625380B2

(12) United States Patent
Chu et al.

(10) Patent No.: US 11,625,380 B2
(45) Date of Patent: Apr. 11, 2023

(54) METHODS, SYSTEMS AND COMPUTER PROGRAMS FOR MANAGING CONTROL SYSTEM ENGINEERING DATA

(71) Applicant: Yokogawa Electric Corporation, Musashino (JP)

(72) Inventors: Ka Wai Kathy Chu, Singapore (SG); Naing Oo Lin, Singapore (SG); Mark Anthony De Castro Cu-Unjieng, Singapore (SG); Grewin Sesma Villarta, Singapore (SG); Wei Yao Breandon Chien, Singapore (SG); Archie Sambitan Orido, Singapore (SG); Janet Delos Santos Tria, Singapore (SG); Shu Hui Yuen, Singapore (SG); Takeshi Mori, Singapore (SG); Ying-Tzu Huang, Singapore (SG); Myo Khine Kyaw, Singapore (SG); Su Su Maung, Singapore (SG)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 221 days.

(21) Appl. No.: 17/092,434

(22) Filed: Nov. 9, 2020

(65) Prior Publication Data
US 2022/0147504 A1    May 12, 2022

(51) Int. Cl.
*G06F 16/22* (2019.01)
*G06F 12/0802* (2016.01)
*G06F 16/27* (2019.01)

(52) U.S. Cl.
CPC ...... *G06F 16/2282* (2019.01); *G06F 12/0802* (2013.01); *G06F 16/27* (2019.01); *G06F 2212/60* (2013.01)

(58) Field of Classification Search
CPC .................................................... G06F 16/2282
USPC .......................................................... 707/620
See application file for complete search history.

(56) References Cited

U.S. PATENT DOCUMENTS

| | | | |
|---|---|---|---|
| 2002/0133484 A1* | 9/2002 | Chau ....................... | G06F 16/86 |
| 2008/0288561 A1* | 11/2008 | Croisettier .......... | G06F 16/2477 |
| 2012/0233586 A1* | 9/2012 | Lewis ..................... | G06F 8/35 717/104 |
| 2015/0242472 A1* | 8/2015 | Kasik ..................... | H04L 67/10 707/722 |

(Continued)

Primary Examiner — Mulumebet Gurmu
(74) Attorney, Agent, or Firm — Sheridan Ross P.C.

(57) ABSTRACT

The invention enables managing of control system engineering data for the purposes of implementing a control system user interface. In an embodiment, implementing the invention comprises (i) receiving data retrieval parameters, (ii) instantiating a temporary database, comprising an original data table and a modified data table, (iii) retrieving, based on the data retrieval parameters, a set of engineering data from one or more engineering data repositories, (iv) storing the retrieved set of engineering data within the original data table, and (v) responsive to an instruction to display a first sub-set of engineering data, (a) retrieving the first sub-set of engineering data from the original data table, (b) storing the first sub-set of engineering data within an internal cache memory, and (c) retrieving the first sub-set of engineering data from the internal cache memory and displaying the data.

21 Claims, 26 Drawing Sheets

100

(56) References Cited

U.S. PATENT DOCUMENTS

| | | | |
|---|---|---|---|
| 2016/0147830 A1* | 5/2016 | Zhong | G06F 16/245 |
| | | | 707/769 |
| 2017/0099183 A1* | 4/2017 | Vaidyanathan | H04L 41/0806 |
| 2017/0109387 A1* | 4/2017 | Brewster | G06F 16/23 |
| 2019/0196737 A1* | 6/2019 | Jahn | G06F 3/0647 |

* cited by examiner

| Table Name: AlarmAttributesOriginal | | |
|---|---|---|
| Column Name | Data Type | Remark |
| AlarmAttrId | Text | Unique key identifier |
| APMPath | Text | Module information |
| APMId | Text | |
| APMName | Text | |
| APMComment | Text | |
| VPProjectName | Text | Engineering project information |
| FBName | Text | |
| DrawingName | Numeric | Binding information |
| FBId | Numeric | Function block information |
| TagName | Text | |
| Model | Text | |
| TagComment | Text | |
| Condition | Text | Reference engineering data |
| Unit | Text | |
| AlarmStatus | Text | Alarm engineering data |
| DetectionInController | Text | |
| ALARM_SET_POINT | Text | |
| AlarmSetPointLowLimit | Numeric | |
| AlarmSetPointHighLimit | Numeric | |
| Hysteresis | Text | |
| OnDelay | Numeric | |
| OffDelay | Numeric | |
| AlarmLevel | Text | |
| AlarmPriorityOriginal | Text | |
| ALARM_PRIORITY | Text | |
| TagMarkColorOriginal | Text | |
| TAG_MARK_COLOR | Text | |
| ALARM_USER | Text | |
| PURPOSE | Text | |
| CONSEQUENCE | Text | |
| ... | ... | |

| Table Name : AlarmAttributesModifier | | |
|---|---|---|
| Column Name | Data Type | Remark |
| AlarmAttributeId | Text | Unique key identifier |
| APMId | Text | Module information |
| FBId | Numeric | Function block information |
| AlarmAttr | Text | Editable alarm engineering data |
| DetectionInController | Text | |
| ALARM_SET_POINT | Text | |
| Hysteresis | Text | |
| OnDelay | Numeric | |
| OffDelay | Numeric | |
| AlarmLevel | Text | |
| ALARM_PRIORITY | Text | |
| TAG_MARK_COLOR | Text | |
| ALARM_USER | Text | |
| PURPOSE | Text | |
| CONSEQUENCE | Text | |
| ... | ... | |

| Table Name: AlarmAttributesNotificationIds | | |
|---|---|---|
| Column Name | Data Type | Remark |
| AlarmAttributeId | Text | Unique key identifier |
| AlarmLevelNotificationId | Text | Related alarm engineering information |
| DetectionControllerNotificationId | Text | |
| HysteresisNotificationId | Text | |
| OnDelayNotificationId | Text | |
| OffDelayNotificationId | Text | |
| ... | ... | |

| Table Name DefaultAPMCodeOrder | | |
|---|---|---|
| Column Name | Data Type | Remark |
| JSMId | Text | Module information |

METHODS, SYSTEMS AND COMPUTER PROGRAMS FOR MANAGING CONTROL SYSTEM ENGINEERING DATA

FIELD OF THE INVENTION

The present invention relates to the field of control system operation and management, and more specifically to methods, systems and computer programs for managing control system engineering data for the purposes of implementing a control system.

BACKGROUND OF THE INVENTION

Industrial environments, for example environments for manufacturing, production, extraction, construction, and others, involve complex systems and devices, and equally complex workflows. The industrial environments implement one or more process control systems (such as distributed control systems) wherein one or more centralized server control platforms are connected to and used to control a plurality of field devices that are deployed within the industrial environment.

Such process control systems typically include, but are not limited to, at least one control server, a plurality of field devices, communication bus to send and receive information between the control server and the plurality of field devices, one or more repositories for storing field device data, and a user interface. Device parameter data defining one or more parameters associated with each device component within the process control system is stored within the one or more repositories as engineering data. Examples of engineering data includes device identification data, device design specification data, and/or device configuration data. The engineering data defines the properties, configuration parameters, operating parameters and/or alarm parameters of devices within the process control system. The engineering data may be stored within one or more data repositories, usually in the form of individual engineering data files.

System users or system operators routinely require to view, modify and/or manage engineering data corresponding to devices within a process control system, for configuration, monitoring or operation of the control system. The viewing, modification and/or management is achieved through a user interface such as a viewer or editor that retrieves engineering data from the one or more engineering data repositories, and enables a user or operator to view, modify, delete, save and/or otherwise manage individual data records or data values within the engineering data.

Figure 1:
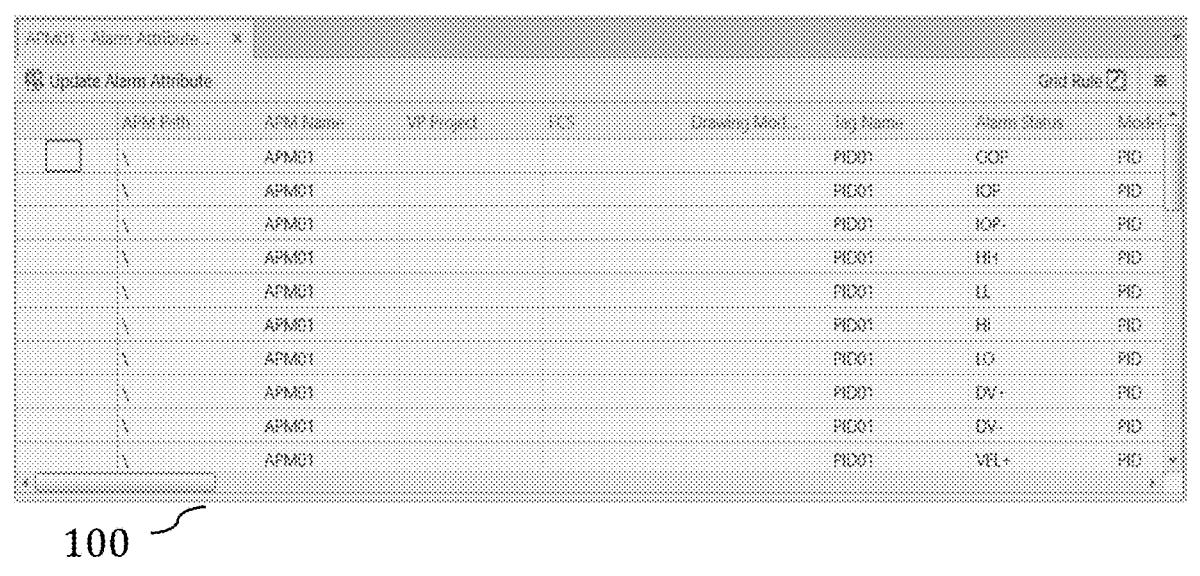

FIG. 1 is a screenshot of an interface screen 100 generated by a user interface configured to retrieve engineering data from one or more engineering data repositories, and that is configured to enable a user or operator to view, modify, delete, save and/or otherwise manage individual data records or data values within the engineering data. The interface screen 100 of FIG. 1 corresponds to a user interface that has been configured to manage alarm attribute data corresponding to field devices within a plant. It would however be understood that the user interface can be configured for managing any other type of engineering data as well. As shown in FIG. 1, the user interface may be provided with horizontal and/or vertical scroll bars, toolbar button or submenus to enable a user to navigate rows or columns of displayed engineering data.

Prior art user interface platforms (such as viewers or editors for engineering data) of the kind described in connection with FIG. 1, are ordinarily configured to permit a maximum specified number data records to be viewed and configured at any given time (for example, a predefined maximum limit of 50,000 data rows).

If the control system or engineering project contains more than this maximum specified number of data records or data rows, the user or system operator is required to successively filter the data multiple times by narrowing it according to different engineering scopes or filters—e.g. by filtering the data accordingly to floor or unit within an industrial plant.

FIG. 2 illustrates an internal memory 200 associated with a processor or data processing system configured to implement a prior art user interface platform of the kind described above. As shown in FIG. 2, the full set of data rows or data records 202 that are permitted to be viewed and configured simultaneously by the user interface (e.g. a full set of 50,000 data rows) are simultaneously stored within the internal memory 200—and the user or system operator is required to navigate these data records by scrolling or filtering on the user interface until a specific record is located.

FIG. 3 is a screenshot of a second interface screen 300 within the user interface discussed in connection with FIG. 1, wherein a filter and/or sort dialog 302 is available or can be pulled up for one or more columns to filter engineering data. The filter dialog 302 based approach has been found to be laborious and time consuming, and is inefficient from a data processing resource standpoint as well—specifically, a user may need to click multiple times to filter out certain engineering data, for instance, for opening a filter dialog, selecting one or more data row(s) etc.

Another approach to working with engineering data that exceeds the maximum number of handleable data records, is to increase the maximum number of data records that the viewer or editor can simultaneously retrieve. This approach has been found to result in unsatisfactory memory handling and in sub-optimal performance of the user interface (viewer or editor interface) when handling a large set of data records, and has also been found to create data integrity problems for large data sets. Additionally, once a user interface has retrieved the maximum allowable number of data rows, scrolling through these records to view a specific record, is laborious and time consuming. Viewing a specific data record can be even more difficult, given that the view area is ordinarily quite small—and trying to scroll, sort or filter through a large set of retrieved data rows (e.g. more than 50,000 data rows) to get to a particular data record is time consuming and susceptible to error.

Another problem with the existing user interfaces for viewing/modifying engineering data is that these interfaces are configured to retrieve engineering data from a large number of engineering data files, store the retrieved data in an internal memory of the processor or server, manipulate or modify the data within the internal memory, and then write the entire set of data records within the internal memory back to each of the relevant engineering files before a fresh set of engineering data can be retrieved by the viewer or editor. The communication throughput and processor resource requirement for each set of such updating operations is quite high—especially where the data has to be retrieved from and written back to a large number of individual engineering data files.

Yet further, existing user interfaces for viewing/modifying engineering data do not provide convenient solutions for tracking or viewing data modifications that have been made by a user or system operator through the viewer or editor.

There is accordingly a need for improved solutions for and managing control system engineering data.

SUMMARY

The present invention relates to the field of control system operation and management, and more specifically to methods, systems and computer programs for managing control system engineering data.

The invention provides a method for managing control system engineering data through a processor implemented interface control server. In an embodiment, the method comprises implementing at the interface control server, the steps of (i) receiving one or more data retrieval parameters for retrieval of engineering data from one or more engineering data repositories, (ii) instantiating a temporary database, wherein instantiating the temporary database includes (a) instantiating an original data table within the temporary database, and (b) instantiating a modified data table within the temporary database, (iii) retrieving a set of engineering data from the one or more engineering data repositories, wherein retrieval of the set of engineering data is based on the one or more received data retrieval parameters, (iv) storing the retrieved set of engineering data in the temporary database, within the instantiated original data table; and (v) responsive to an instruction to display a first sub-set of engineering data from within the set of engineering data stored within the temporary database, (c) retrieving the first sub-set of engineering data from the original data table within the temporary database, (d) storing the first sub-set of engineering data within an internal cache memory that is coupled with the interface control server, and (e) displaying the first sub-set of engineering data on a display device, wherein the first sub-set of engineering data is retrieved for display, from the internal cache memory.

The method of the present invention, wherein responsive to an instruction to display a second sub-set of engineering data from within the set of engineering data stored within the temporary database, the interface control server (i) retrieves the second sub-set of engineering data from the original data table within the temporary database, (ii) stores the second sub-set of engineering data within the internal cache memory, (iii) displays the second sub-set of engineering data on the display device, wherein the second sub-set of engineering data is retrieved for display, from the internal cache memory, and (iv) deletes the first sub-set of engineering data from the internal cache memory.

In one embodiment of the method instantiating the temporary database includes implementing at the interface control server, the steps of (i) instantiating a notification data table within the temporary database and storing notification data retrieved from the engineering data repositories within the notification data table, wherein the notification data correlates a plurality of engineering data records that require to be edited or updated together; or (ii) instantiating a reference data table within the temporary database and storing reference data retrieved from the engineering data repositories within the reference data table, wherein the reference data comprises information that enables grouping or ordering of data rows for the purpose of display.

In another embodiment the method includes implementing at the interface control server, the steps of (i) receiving user input identifying a modification to a data value within a displayed data row that comprises engineering data stored in the internal cache memory, (ii) generating one or more modified data rows based on the received user input and on the engineering data corresponding to the displayed data row that is stored in the internal cache memory, (iii) storing the one or more modified data rows in the internal cache memory, and (iv) responsive to detection of a data synchronization trigger event, initiating a data synchronization operation between the internal cache memory and the temporary database, wherein the data synchronization operation comprises writing data values that have been modified subsequent to an immediately previous data synchronization operation, from the internal cache memory to the modified data table within the temporary database.

In a particular embodiment of the method, the interface control server responds to receiving an instruction for retrieving engineering data from the temporary database in a first data retrieval mode, by implementing the steps of (i) retrieving engineering data from the original data table based on one or more data retrieval parameters, (ii) identifying a second set of data rows within the modified data table that correspond to a first set of data rows within the engineering data that has been retrieved from the original data table based on the one or more data retrieval parameters, (iii) retrieving the identified second set of data rows from the modified data table, (iv) combining the data values within the first set of data rows and associated data values within the second set of data rows to generate one or more combined data rows, and (v) storing the generated combined data rows in the internal cache memory for display on the display device.

The method may include an embodiment where the interface control server responds to receiving an instruction for retrieving engineering data from the temporary database in a second data retrieval mode, by implementing the steps of (i) retrieving engineering data from the modified data table based on one or more data retrieval parameters, (ii) identifying a second set of data rows within the original data table that correspond to a first set of data rows within the engineering data that has been retrieved from the modified data table based on the one or more data retrieval parameters, (iii) retrieving the identified second set of data rows from the original data table, (iv) combining the data values within the first set of data rows and associated data values within the second set of data rows to generate one or more combined data rows, and (v) storing the generated combined data rows in the internal cache memory for display on the display device.

In a further method embodiment, the interface control server responds to receiving an instruction for retrieving engineering data from the temporary database, by implementing the steps of (i) retrieving engineering data from the temporary database, (ii) parsing data within the internal cache memory for identifying any previously stored data rows having a key identifier that matches a key identifier corresponding to a data row within the engineering data retrieved from the temporary database, and (iii) responsive to identifying a previously stored data row within the internal cache memory that has a key identifier that matches a key identifier corresponding to a data row within the engineering data retrieved from the temporary database, retrieving the identified previously stored data row from within the internal cache memory and storing within the retrieved previously stored data row, one or more data values from within the matched data row from the engineering data retrieved from the temporary database.

In a specific embodiment of the method, the interface control server responds to receiving an instruction for retrieving engineering data from the temporary database, by implementing the steps of (i) retrieving engineering data from the temporary database, (ii) parsing data within the internal cache memory for identifying any previously stored data rows having a key identifier that matches a key identifier corresponding to a data row within the engineering data retrieved from the temporary database, and (iii) responding to a determination that the key identifier corresponding to the data row within the engineering data retrieved from the temporary database does not match key identifier(s) corresponding to any of the previously stored data rows within the internal cache memory, by implementing the steps of (a) instantiating a new data row within the internal cache memory, and (b) storing within the instantiated new data row, the data row within the engineering data that has been retrieved from the temporary database.

The method may provide an embodiment wherein the interface control server responds to receiving an instruction for persisting data, by implementing the steps of (i) identifying one or more modified data rows within the internal cache memory; (ii) storing data values extracted from the identified one or more modified data rows in a corresponding data row within the original data table in the temporary database, (iii) deleting the modified data table in the temporary database, and (iv) deleting the one or more modified data rows from the internal cache memory.

In a more specific embodiment of the method, the step of storing data values extracted from the identified one or more modified data rows in a corresponding data row within the original data table in the temporary database is (i) succeeded by the step of storing the data values extracted from the identified one or more modified data rows, in an engineering data repository, or (ii) preceded by the step of storing the data values extracted from the identified one or more modified data rows, in an engineering data repository.

In a method embodiment, the interface control server responds to receiving a predefined trigger instruction by implementing the steps of (i) checking the amount of free system memory within the interface control server, and (ii) responsive to the free system memory being less than a predefined threshold value, generate an insufficient memory alert through the interface control server.

The invention additionally provides a system for managing control system engineering data through a processor implemented interface control server. The system comprises a processor implemented interface control server configured for (i) receiving one or more data retrieval parameters for retrieval of engineering data from one or more engineering data repositories, (ii) instantiating a temporary database, wherein instantiating the temporary database includes (a) instantiating an original data table within the temporary database, and (b) instantiating a modified data table within the temporary database, (iii) retrieving a set of engineering data from the one or more engineering data repositories, wherein retrieval of the set of engineering data is based on the one or more received data retrieval parameters, (iv) storing the retrieved set of engineering data in the temporary database, within the instantiated original data table, and (v) responsive to an instruction to display a first sub-set of engineering data from within the set of engineering data stored within the temporary database, (c) retrieving the first sub-set of engineering data from the original data table within the temporary database, (d) storing the first sub-set of engineering data within an internal cache memory that is coupled with the interface control server, and (e) displaying the first sub-set of engineering data on a display device, wherein the first sub-set of engineering data is retrieved for display, from the internal cache memory.

In an embodiment of the system, the interface control server is configured to respond to an instruction to display a second sub-set of engineering data from within the set of engineering data stored within the temporary database, by (i) retrieving the second sub-set of engineering data from the original data table within the temporary database, (ii) storing the second sub-set of engineering data within the internal cache memory, (iii) displaying the second sub-set of engineering data on the display device, wherein the second sub-set of engineering data is retrieved for display, from the internal cache memory, and (iv) deleting the first sub-set of engineering data from the internal cache memory.

In an embodiment of the system, the interface control server is configured such that instantiating the temporary database includes (i) instantiating a notification data table within the temporary database and storing notification data retrieved from the engineering data repositories within the notification data table, wherein the notification data correlates a plurality of engineering data records that require to be edited or updated together, or (ii) instantiating a reference data table within the temporary database and storing reference data retrieved from the engineering data repositories within the reference data table, wherein the reference data comprises information that enables grouping or ordering of data rows for the purpose of display.

In a specific embodiment of the system, the interface control server is configured for implementing (i) receiving user input identifying a modification to a data value within a displayed data row that comprises engineering data stored in the internal cache memory, (ii) generating one or more modified data rows based on the received user input and on the engineering data corresponding to the displayed data row that is stored in the internal cache memory, (iii) storing the one or more modified data rows in the internal cache memory, and (iv) responsive to detection of a data synchronization trigger event, initiating a data synchronization operation between the internal cache memory and the temporary database, wherein the data synchronization operation comprises writing data values that have been modified subsequent to an immediately previous data synchronization operation, from the internal cache memory to the modified data table within the temporary database.

In a system embodiment, the interface control server is configured to respond to receiving an instruction for retrieving engineering data from the temporary database in a first data retrieval mode, by (i) retrieving engineering data from the original data table based on one or more data retrieval parameters, (ii) identifying a second set of data rows within the modified data table that correspond to a first set of data rows within the engineering data that has been retrieved from the original data table based on the one or more data retrieval parameters, (iii) retrieving the identified second set of data rows from the modified data table, (iv) combining the data values within the first set of data rows and associated data values within the second set of data rows to generate one or more combined data rows, and (v) storing the generated combined data rows in the internal cache memory for display on the display device.

The interface control server within the system may be configured to respond to receiving an instruction for retrieving engineering data from the temporary database in a second data retrieval mode, by (i) retrieving engineering data from the modified data table based on one or more data retrieval parameters, (ii) identifying a second set of data rows within the original data table that correspond to a first set of data rows within the engineering data that has been retrieved from the modified data table based on the one or more data retrieval parameters, (iii) retrieving the identified second set of data rows from the original data table, (iv)

combining the data values within the first set of data rows and associated data values within the second set of data rows to generate one or more combined data rows, and (v) storing the generated combined data rows in the internal cache memory for display on the display device.

The interface control server may be configured to respond to receiving an instruction for retrieving engineering data from the temporary database, by (i) retrieving engineering data from the temporary database, (ii) parsing data within the internal cache memory for identifying any previously stored data rows having a key identifier that matches a key identifier corresponding to a data row within the engineering data retrieved from the temporary database, and (iii) responsive to identifying a previously stored data row within the internal cache memory that has a key identifier that matches a key identifier corresponding to a data row within the engineering data retrieved from the temporary database, retrieving the identified previously stored data row from within the internal cache memory and storing within the retrieved previously stored data row, one or more data values from within the matched data row from the engineering data retrieved from the temporary database.

In another embodiment of the system, the interface control server responds to receiving an instruction for retrieving engineering data from the temporary database, by (i) retrieving engineering data from the temporary database, (ii) parsing data within the internal cache memory for identifying any previously stored data rows having a key identifier that matches a key identifier corresponding to a data row within the engineering data retrieved from the temporary database, and (iii) responding to a determination that the key identifier corresponding to the data row within the engineering data retrieved from the temporary database does not match key identifier(s) corresponding to any of the previously stored data rows within the internal cache memory, by implementing the steps of (a) instantiating a new data row within the internal cache memory, and (b) storing within the instantiated new data row, the data row within the engineering data that has been retrieved from the temporary database.

In a system embodiment, the interface control server is configured to respond to receiving an instruction for persisting data, by (i) identifying one or more modified data rows within the internal cache memory, (ii) storing data values extracted from the identified one or more modified data rows in a corresponding data row within the original data table in the temporary database; (iii) deleting the modified data table in the temporary database, and (iv) deleting the one or more modified data rows from the internal cache memory.

The system may include an embodiment configured such that the step of storing data values extracted from the identified one or more modified data rows in a corresponding data row within the original data table in the temporary database is (i) succeeded by the step of storing the data values extracted from the identified one or more modified data rows, in an engineering data repository, or (ii) preceded by the step of storing the data values extracted from the identified one or more modified data rows, in an engineering data repository.

In an embodiment of the system, the interface control server is configured to respond to receiving a predefined trigger instruction by (i) checking the amount of free system memory within the interface control server, and (ii) responsive to the free system memory being less than a predefined threshold value, generating an insufficient memory alert through the interface control server.

The invention further provides a computer program product for managing control system engineering data through a processor implemented interface control server. The computer program product comprises a non-transitory computer usable medium having a computer readable program code embodied therein, the computer readable program code comprising instructions for implementing within a processor based computing system, the steps of (i) receiving one or more data retrieval parameters for retrieval of engineering data from one or more engineering data repositories, (ii) instantiating a temporary database, wherein instantiating the temporary database includes (a) instantiating an original data table within the temporary database and (b) instantiating a modified data table within the temporary database, (iii) retrieving a set of engineering data from the one or more engineering data repositories, wherein retrieval of the set of engineering data is based on the one or more received data retrieval parameters, (iv) storing the retrieved set of engineering data in the temporary database, within the instantiated original data table, and (v) responsive to an instruction to display a first sub-set of engineering data from within the set of engineering data stored within the temporary database, (c) retrieving the first sub-set of engineering data from the original data table within the temporary database, (d) storing the first sub-set of engineering data within an internal cache memory that is coupled with the interface control server; and (e) displaying the first sub-set of engineering data on a display device, wherein the first sub-set of engineering data is retrieved for display, from the internal cache memory.

BRIEF DESCRIPTION OF THE ACCOMPANYING DRAWINGS

FIG. 1 is a screenshot of an interface screen within a prior art user interface of a type that is configured to retrieve engineering data from one or more engineering data repositories, and that enables a user or system operator to view, modify, delete, save and/or otherwise manage individual data records or data values within the engineering data.

FIG. 7 is a screenshot of an interface screen having a selectable "modified only" mode that enables presentation of only those data rows or data records or data values that have been modified since an earlier save or persist instruction.

FIG. 10 illustrates an example of an original data table instantiated within the temporary database of FIG. 9.

FIG. 11 illustrates an example of a modified data table instantiated within the temporary database of FIG. 9.

FIG. 12 illustrates an example of a notification data table instantiated within the temporary database of FIG. 9.

FIG. 13 illustrates an example of a reference data table instantiated within the temporary database of FIG. 9.

DETAILED DESCRIPTION

The present invention provides methods, systems and computer programs for managing control system engineering data for the purposes of implementing a control system user interface.

Figure 2:
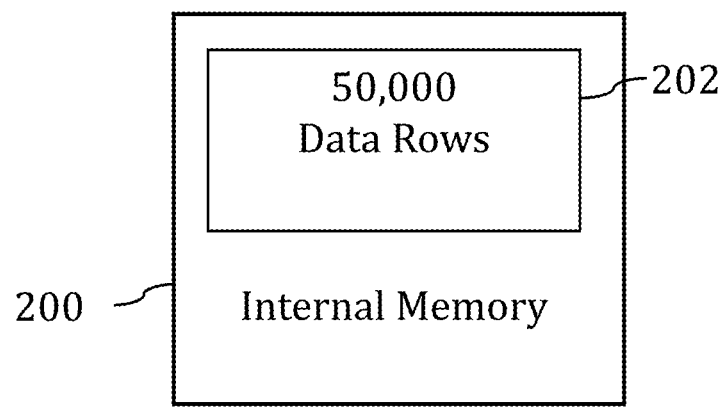
FIG. 2 illustrates an internal memory configured to implement a prior art user interface of the kind described in connection with FIG. 1.
Figure 3:
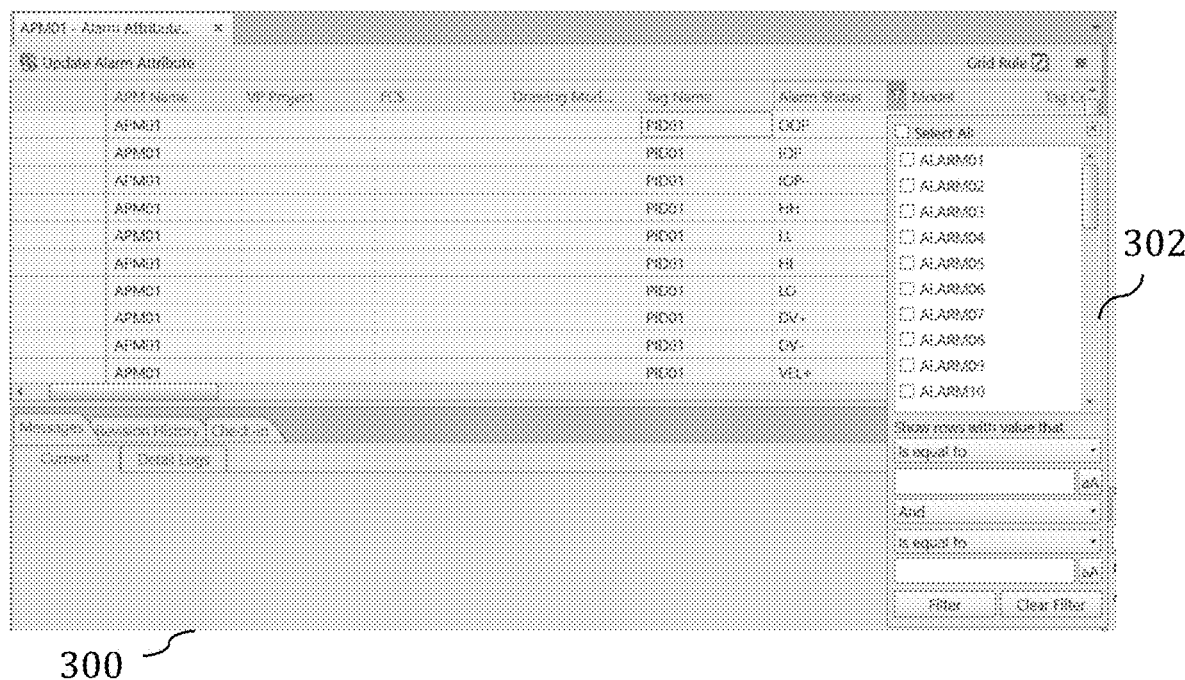
FIG. 3 is a screenshot of a second interface screen within the prior art user interface.
Figure 4:
FIG. 4 is a screenshot of a user interface configured in accordance with the teachings of the present invention, having one or more page navigation controls.

The invention provides interface platforms wherein a user or operator can retrieve and manage large amounts of engineering data without having to limit the retrieved data based on one or more scope based filters, while simultaneously avoiding having to sacrifice available system memory (i.e. the availability of free system memory within interface control server 1400) or performance. The invention achieves this through an interface configured to load into an internal cache memory, a selected sub-set of a larger set of engineering data that has been retrieved from engineering data files, wherein the selected sub-set of engineering data that is loaded into the internal cache memory comprises the sub-set of engineering data that is required for a current page view of the user interface. FIG. 4 is a screenshot of a user interface 400 that is configured in accordance with the teachings of the present invention, having one or more on-demand page navigation controls. The page navigation controls in user interface 400 enables discrete pages of data (each page comprising n data rows) to be retrieved and stored in an internal cache memory for viewing. Each discrete page view comprises a sub-set of the larger set of engineering data that has been retrieved from engineering data files and stored in a temporary database, and a particular page or sub-set of data is only retrieved and stored in the internal cache memory when a user or operator selects that particular page of data rows for viewing through the user interface. When a user or operator selects a new page of data rows for viewing, the earlier page of data rows that is stored in the internal cache memory may optionally be discarded or deleted from the internal cache memory, and the new page of data rows is retrieved from a temporary database and stored within the internal cache memory.

Figure 5:
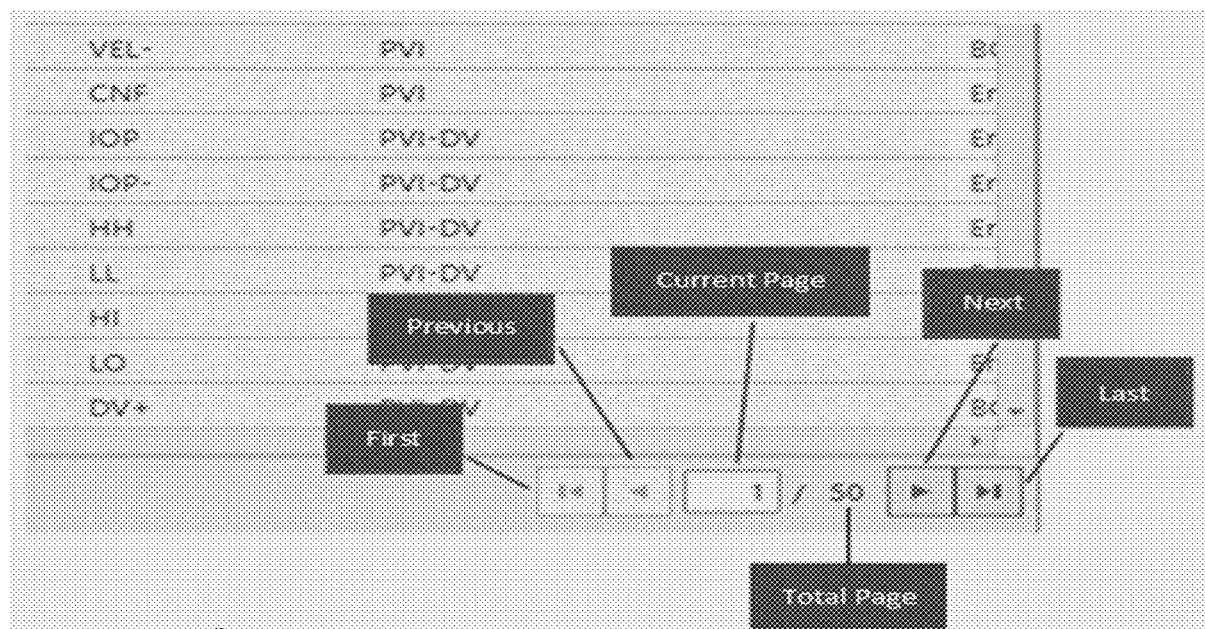
FIG. 5 is a screenshot of a magnified view of the user interface of FIG. 4.

FIG. 5 is a screenshot of a magnified view of the user interface 400 that is configured in accordance with the teachings of the present invention—highlighting exemplary page navigation controls, which may include windows showing the current page number and the total page numbers, and may also include navigation controls for respectively loading the first page of data rows, loading an immediately preceding page of data rows, loading an immediately successive page of data rows, and loading the last page of data rows. Responsive to the navigation controls being used to select a particular page of data rows for viewing, the data rows of the selected page are uploaded into the internal cache memory from a temporary database—while data rows of the previously selected page may optionally be deleted from or purged from the internal cache memory.

Figure 6:
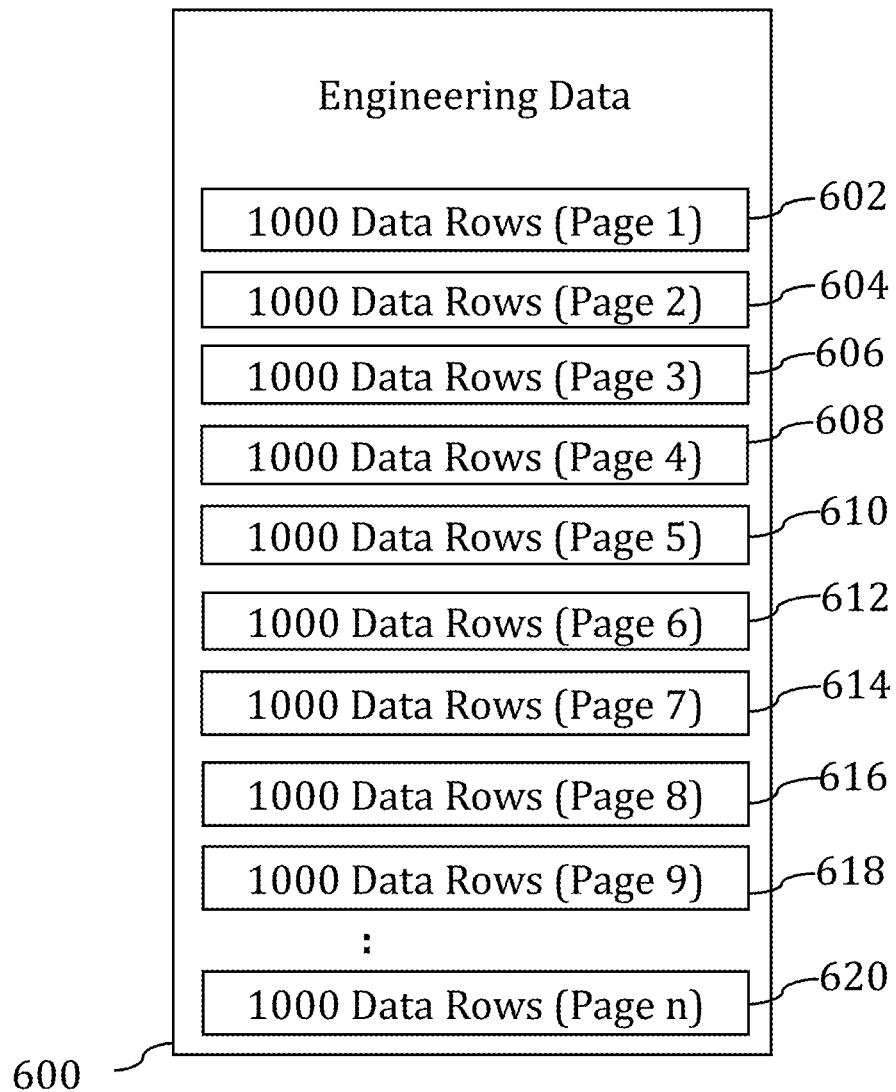
FIG. 6 illustrates a page view based segmentation of a set of engineering data, in accordance with the teachings of the present invention.

FIG. 6 illustrates the above discussed page view based segmentation of a set of engineering data 600. As shown in FIG. 6, the full set of engineering data can be segmented into a plurality of sub-sets of data rows—for example, pages 1 to n, 602 to 620—wherein each page comprises a sub-set of data rows from the full set of engineering data. In the exemplary illustration of FIG. 6, each of pages 1 to n comprises a discrete set of 1000 data rows. As discussed above, a user or operator may select a specific page of data rows for viewing through the user interface (which selection may be made through the page navigation controls), and responsive to such selection, the data rows of the selected page may be uploaded to or stored within the internal cache memory from a temporary database, for display and access through the user interface.

Figure 7:
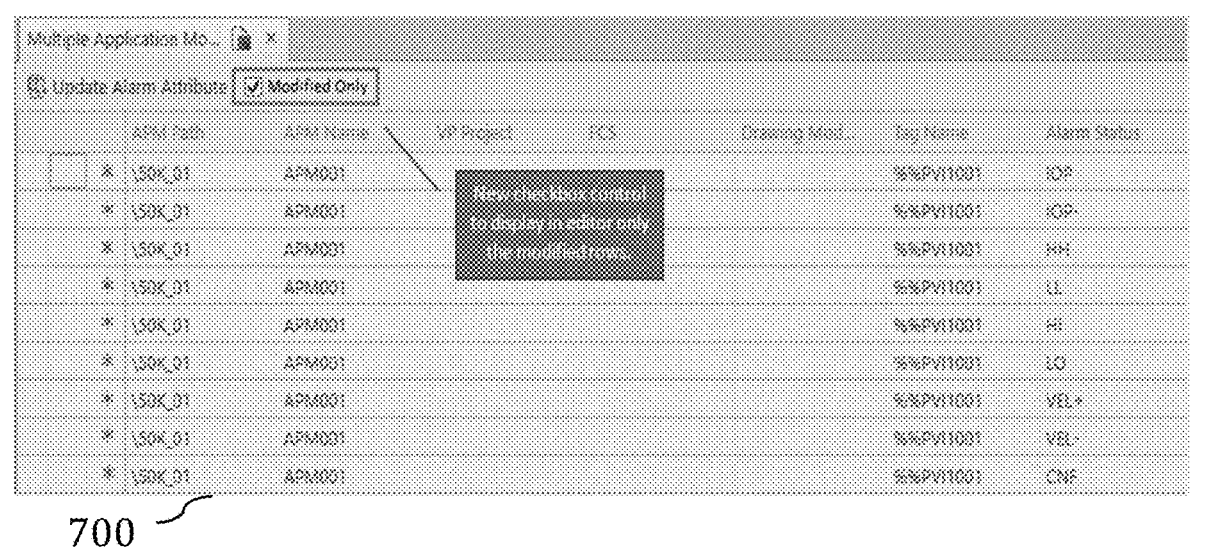

In addition to the above, the invention also provides a user interface that enables convenient tracking or viewing of data modifications to engineering data, that have been made by a user or operator through the user interface. The user interface of the present invention enables this through a "modified only" mode—wherein a user or operator is presented with a view of only those data rows or data records or data values that have been modified since the last save or persist instruction. FIG. 7 is a screenshot of an interface screen 700 which has a selectable "modified only" mode that enables presentation of only those data rows or data records or data values that have been modified since the last save or persist instruction. The "modified only" mode is particularly useful as it enables a user or operator to conveniently track and revisit data records that have been changed since the last save or persist instruction, without having to go through all data records associated with the engineering data, for identifying or revisiting recent changes.

The systems and methods through which the above described embodiments of the invention can be implemented, are described in detail below.

Figure 8:
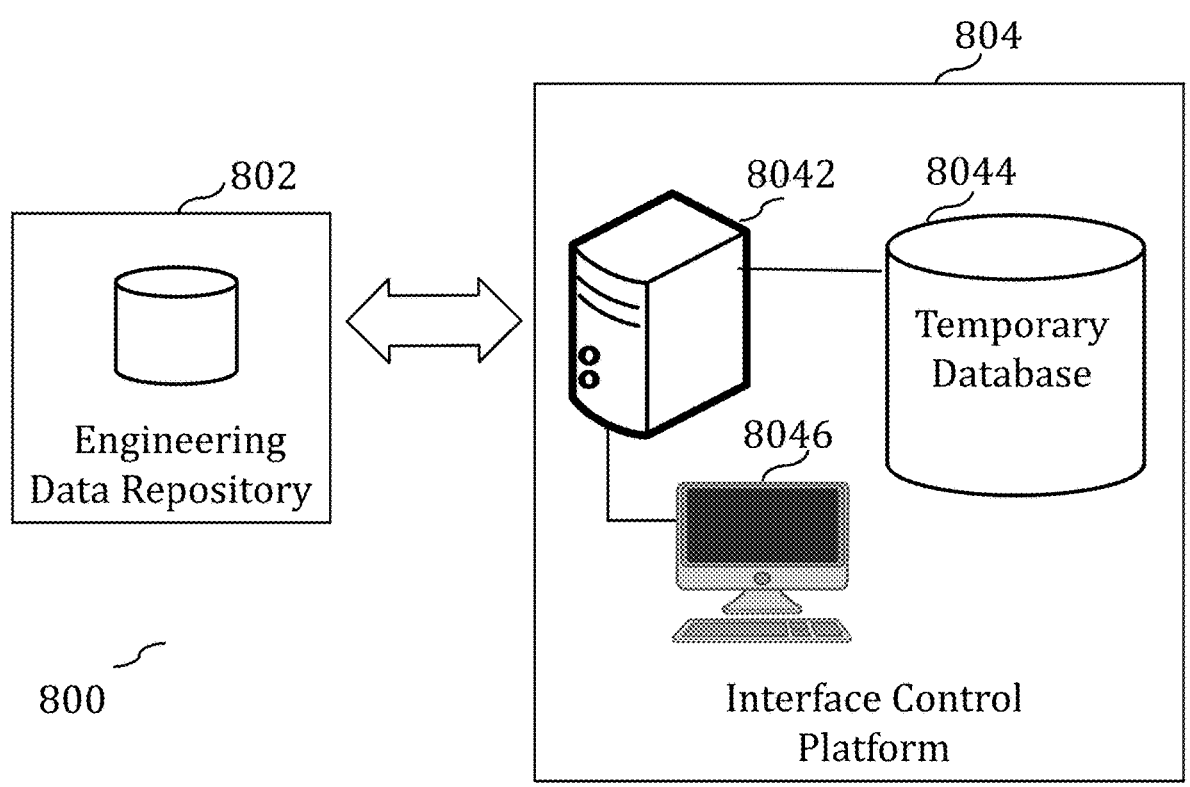
FIG. 8 illustrates a system configured for providing and controlling a user interface in accordance with the teachings of the present invention.

FIG. 8 illustrates a system 800 configured for providing and controlling a user interface in accordance with the teachings of the present invention. System 800 comprises one or more engineering data repositories 802—each such repository comprising a non-transient memory storage that stores engineering data corresponding to a control system, or an industrial environment or a process control environment. In various embodiments the one or more engineering data repositories 802 may comprise one or more engineering data files, one or more databases or tables of engineering data, and/or any combination thereof.

The one or more engineering data repositories 802 are communicably coupled with an interface control platform 804 that is configured to implement a user interface for viewing, modifying and managing engineering data retrieved from the one or more engineering data repositories 802.

The interface control platform 804 comprises an interface control server 8042, a temporary database 8044 and a display device 8046. The interface control server 8042 is configured to retrieve engineering data from the one or more engineering data repositories 802 and to generate a temporary database 8044 within or communicably coupled with the interface control server 8042 for storing the retrieved engineering data. The temporary database 8044 is thereafter used as a data source for sub-sets of engineering data (for example pages of data rows) that requires to be uploaded into an internal cache memory within or associated with the interface control server, for enabling the interface control server 8042 to display said sub-sets of engineering data through a user interface rendered on display device 8046. The configuration and functionality of the interface control server 8042 and the temporary database 8044 are described in more detail below.

Figure 9:
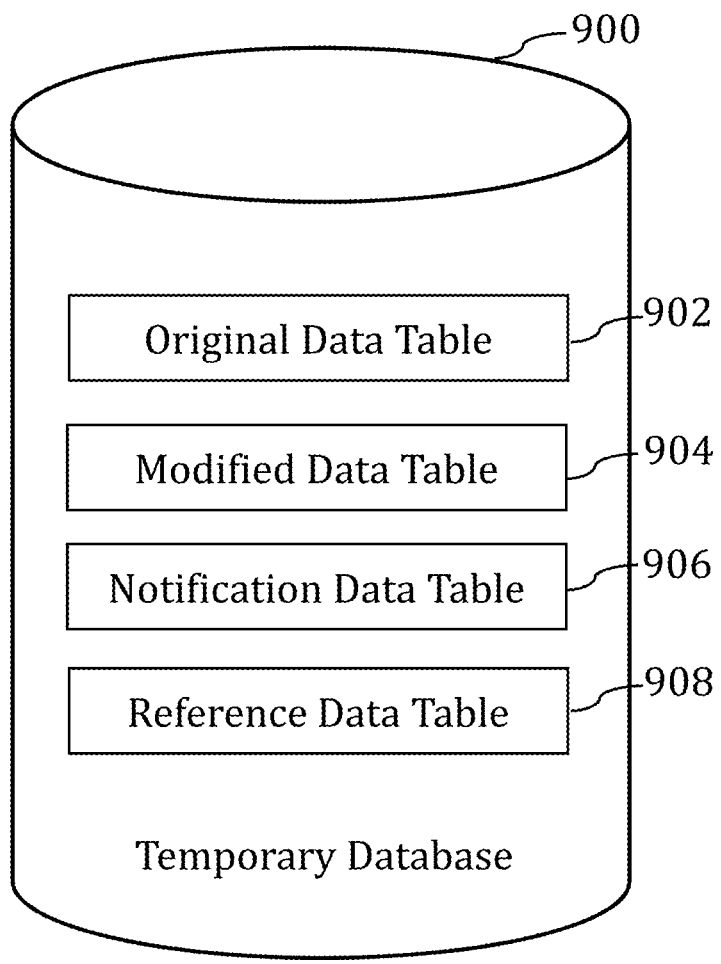
FIG. 9 illustrates a temporary database instantiated and configured in accordance with the teachings of the present invention.

FIG. 9 illustrates a temporary database 900 instantiated and configured in accordance with the teachings of the present invention. The temporary database 900 may be created within a non-transient memory storage within or communicably coupled with the interface control server 8042. In an embodiment, the communication throughput or data transfer speed between the interface control server 8042 and the temporary database 900 may be higher than the communication throughput or data transfer speed between the engineering data repository 802 and the interface control server 8042.

The temporary database 900 may be instantiated or generated when a user interface (i.e. a viewer or editor for engineering data) is first launched for the purpose of viewing or modifying engineering data. The temporary database 900 may be instantiated at a system defined internal storage location—wherein instructions for identifying the internal storage location may be provided by the user interface or editor. As shown in FIG. 9, the temporary database 900 comprises a plurality of data tables, including any of (and preferably all of) an original data table 902, a modified data table 904, a notification data table 906 and a reference data table 908.

Original data table 902 may be instantiated by the interface control server 8042 and may be configured to store all engineering information that has been retrieved from the engineering data repository(ies) 802—for example, any of alarm engineering data, device parameter data, module information, engineering project information, module binding information, and/or reference engineering information—which may be used to construct data rows for one or more page views by the user interface or editor. FIG. 10 illustrates a non-limiting exemplary embodiment of an original data table 1000 of a kind that may be instantiated within the temporary database 900—which in the illustrative embodiment has been used to store alarm attribute data corresponding to one or more alarm attributes or parameters corresponding to a control system.

Modified data table 904 may be instantiated by the interface control server 8042 and may be configured to store only modified information that has been generated or modifications made by the user or operator since the last save or persist instruction received through the user interface. Stated differently, the modified data table 904 stores engineering data that has been edited or modified. The modified data table 904 is empty by default and is only populated with modified engineering data values. In an embodiment, the modified data table is populated with modified engineering data values based on a system instruction that is generated in response to a detected next user action or next user input that requires retrieval of data from temporary database 900 (e.g. any detected user action or input that involves sorting, moving, paging, searching filtering etc. of engineering data that has been retrieved from the engineering data repository(ies) 802 and that is stored within temporary database 900).

The data within the modified data table 904 is used for the purposes of generating a "modified only" view of the type discussed in connection with FIG. 7—and which is described in more detail subsequently in this written description.

FIG. 11 illustrates a non-limiting exemplary embodiment of a modified data table 1100 of a kind that may be instantiated within the temporary database 900—which in the illustrated embodiment has been used to store modified alarm data corresponding to one or more alarm attributes or parameters corresponding to a control system.

Notification data table 906 may be instantiated by the interface control server 8042 and may be configured to describe or correlate related engineering data items or data records which are required to be edited or updated together. For example, data specifying that changing alarm settings for High-High alarms will trigger corresponding updates or application of the same settings to the corresponding Low-Low alarms for the same component or device or for another component or device. Stated differently, the notification data table 904 stores information identifying relationships among a plurality of data rows within retrieved engineering data. FIG. 12 illustrates a non-limiting exemplary embodiment of a notification data table 1200 of a kind that may be instantiated within the temporary database 900—which has been used to store information identifying relationships between a plurality of alarm attributes or parameters belonging to different data rows corresponding to a control system.

Reference data table 908 may be instantiated by the interface control server 8042 and may be configured to store non-critical reference engineering information, for example, information describing or representing the grouping, hierarchy and/or the layout of modules within a control system, the order of alarm data settings, etc. The functional objective of data stored within the reference data table 908 is to enable grouping or ordering of data rows together for the purpose of display in one or more views through the user interface. FIG. 13 illustrates a non-limiting exemplary embodiment of a reference data table 1300 of a kind that may be instantiated within the temporary database 900—which has been used to store reference data corresponding to one or more devices or modules within a control system.

The underlying temporary database may be any type of database, for example, SQLITE or MS SQL database, as long as it supports traditional CRUD, i.e. create, read, update, delete operations. The main purpose of a temporary database is to perform operations such as sort, filter, search on the database layer instead of the presentation layer because the current view is loaded with partial engineering data. The size of database and the number of tables and columns on each table could be varied depends on the engineering requirements. In some cases, more than one database could be used to load and navigate within the large amount of engineering data.

Figure 14:
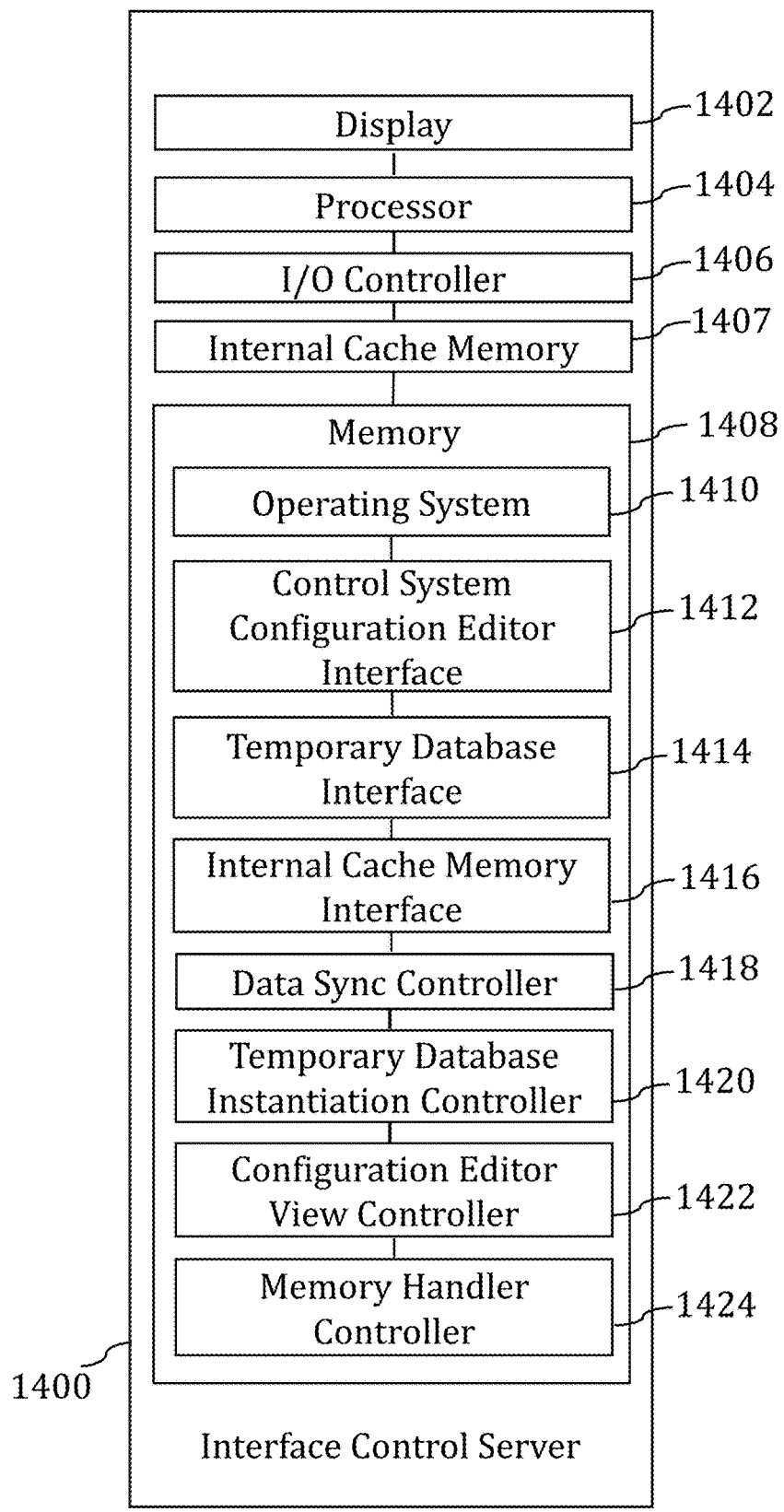
FIG. 14 illustrates an interface control server configured in accordance with the teachings of the present invention.

FIG. 14 illustrates an interface control server 1400 configured in accordance with the teachings of the present invention. Interface control server 1400 and one or more components therewithin may be configured to implement or execute one or more, and in certain cases all of the method steps of any of FIGS. 15 to 25 as described in more detail subsequently within this specification.

Interface control server 1400 may include (i) a display 1402, (ii) a processor 1404 configured for data processing operations within interface control server 1400, (iii) an I/O controller 1406 configured to enable input-output functionality associated with interface control server 1400, (iv) an internal cache memory 1407 coupled with the processor 1404, and (v) a memory 1408, which memory 1408 includes transitory memory and/or non-transitory memory.

In an embodiment, memory 1408 may have stored therewithin, an operating system 1410 configured for managing device hardware and software resources and that provides common services for software programs implemented within the interface control server 1400.

Memory 1408 may also have stored therewithin a control system configuration editor interface 1412 configured to enable a user or operator to view, edit, modify, save or delete data values corresponding to data parameters associated with devices or components within a control system. In an embodiment, the control system configuration editor interface 1412 may be configured to implement or enable implementation of some or all of the method steps disclosed in connection with the methods of one or more of FIGS. 15 to 25 that are described in more detail hereinbelow. The control system configuration editor interface 1412 may be configured to generate and control operation of a viewer or editor interface to enable viewing and modification of engineering data in accordance with teachings of the present invention.

Memory 1408 may include a temporary database interface 1414 that is configured for interfacing with and for reading and writing data from and to a temporary database of the kind described in connection with FIG. 9 hereinabove.

Memory 1408 may further include an internal cache memory interface 1416 that is configured for interfacing with and for reading and writing data from and to an internal cache memory 1407 within or coupled with the interface control server 1400.

Memory 1408 may also include a data sync controller 1418 that is configured for synchronizing data stored within the internal cache memory 1407 (that is within or coupled with the interface control server 1400), to a temporary database 900 of the kind described in connection with FIG. 9 hereinabove. In an embodiment, the data sync controller 1418 may be configured to implement one or more methods in accordance with the teachings of FIG. 18 (which is described in more detail subsequently within this written description).

Memory 1408 includes a temporary database instantiation controller 1420 that is configured for instantiating or generating a temporary database 900 of the kind illustrated in FIG. 9. In an embodiment, the temporary database instantiation controller 1420 may be configured to implement one or more of the method steps of FIG. 15 (which is described in more detail subsequently within this written description).

Memory 1408 may also include a configuration editor view controller 1422 that is configured for controlling the data records or data rows that are retrieved from a temporary database 900 and displayed through the control system configuration editor interface 1412 on a display device (e.g. on display device 8046). In an embodiment, the configuration editor view controller 1422 may be configured to implement one or more of the method steps of FIG. 16 (which is described in more detail subsequently within this written description).

Memory 1408 may also include a memory handler controller 1424 that is configured for one or more of monitoring a state of the internal cache memory 1407, and for raising "insufficient memory" alerts in response to detecting an insufficiency of available system memory (i.e. the availability of free system memory within interface control server 1400). In an embodiment, the memory handler controller 1424 may be configured to implement one or more of the method steps of FIG. 24 (which is described in more detail subsequently within this written description).

Generating a Temporary Database for Viewing and Modifying Engineering Data

Figure 15:
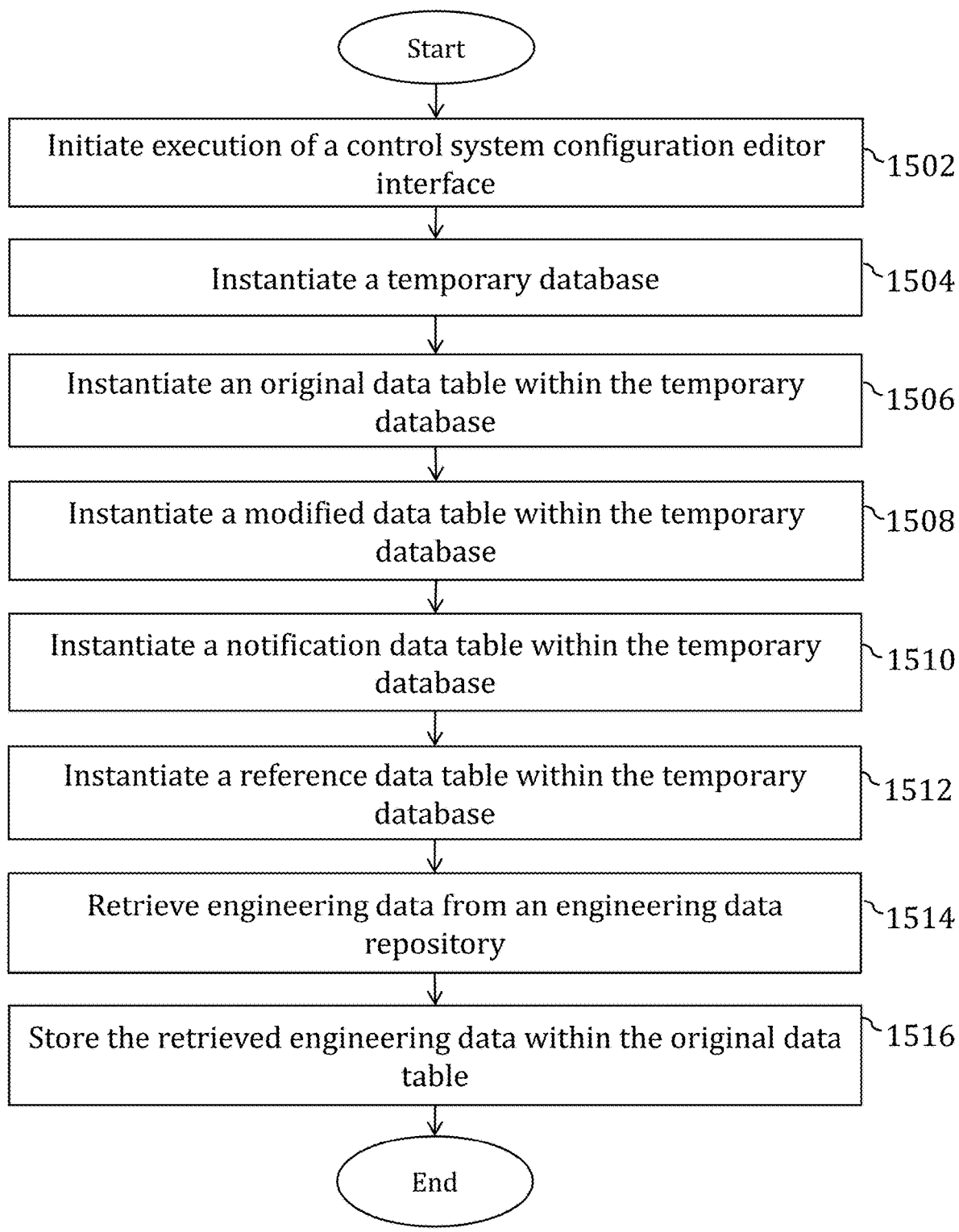
FIG. 15 is a flowchart illustrating a method of instantiating a temporary database in accordance with the teachings of the present invention.

FIG. 15 is a flowchart illustrating a method of instantiating a temporary database in accordance with the teachings of the present invention. In an embodiment, the method steps of FIG. 15 may be implemented within interface control server 1400, and in a more specific embodiment, may be implemented within temporary database instantiation controller 1420.

Step 1502 comprises initiating execution of a control system configuration editor interface 1412. The execution of the control system configuration editor interface 1412 may be initiated based on a trigger event—for example, a user or operator instruction received at interface control server 1400.

Step 1504 comprises instantiating a temporary database 900—wherein the temporary database 900 may be instantiated or generated within a non-transient memory storage device within or communicably coupled with interface control server 1400. In an embodiment, temporary database 900 may be instantiated by a temporary database instantiation controller 1420 of the type illustrated in FIG. 14.

Step 1506 comprises instantiating an original data table 902—wherein the original data table 902 is instantiated or generated within temporary database 900.

Step 1508 comprises instantiating a modified data table 904—wherein the modified data table 904 is instantiated or generated within temporary database 900.

Step 1510 comprises instantiating a notification data table 906—wherein the notification data table 906 is instantiated or generated within temporary database 900.

Step 1512 comprises instantiating a reference data table 908—wherein the reference data table 908 is instantiated or generated within temporary database 900.

Step 1514 thereafter comprises retrieving engineering data from an engineering data repository 802 (for example, from a plurality of engineering data files within an engineering data repository 802). The engineering data that is retrieved at step 1514 may be selected for retrieval based on one or more data retrieval parameters provided by a user or operator through the control system configuration editor interface 1412.

At step 1516, the retrieved engineering data is stored within the original data table 902 within the temporary database 900. Optionally, the method of FIG. 15 may also include retrieving notification data from an engineering data repository 802 and storing it within the instantiated notification data table 906, and/or retrieving reference data from an engineering data repository 802 and storing it within the instantiated reference data table 908.

The generation and use of a temporary database 900 in accordance with the method of FIG. 15 has been found to enable efficient handling of large amounts of engineering data, using page navigation controls. The temporary database 900 improves memory utilization, optimizes usage and availability of system memory, improves performance efficiencies of the interface control server 1400 and improves data reliability. As discussed in more detail below, use of the temporary database 900 also enables implementation of a "modified only" mode, so that a user or system operator can conveniently track changes that have been made to engineering data through an interface control server 1400.

Retrieval of Engineering Data from the Temporary Database

Figure 16:
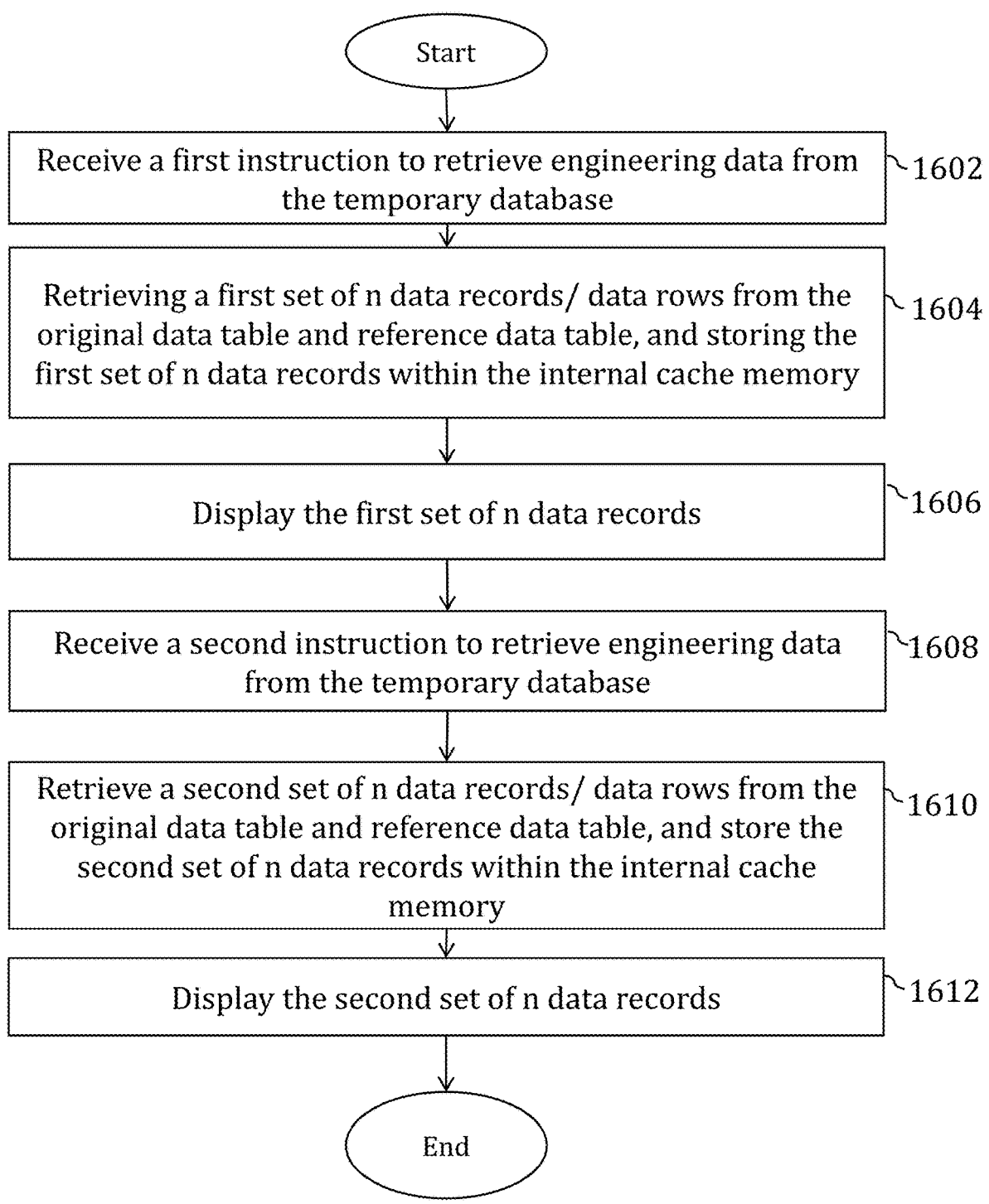
FIG. 16 is a flowchart illustrating a method of presenting engineering data retrieved from a temporary database, through a control system configuration editor interface in accordance with the teachings of the present invention.

FIG. 16 is a flowchart illustrating a method of presenting engineering data that has been stored within temporary database 900 to a user or operator through the control system configuration editor interface 1412 in accordance with the teachings of the present invention. In an embodiment, the method steps of FIG. 16 may be implemented within interface control server 1400, and in a more specific embodiment, may be implemented within configuration editor view controller 1422.

Step 1602 comprises receiving through the control system configuration editor interface 1412, a first instruction to retrieve engineering data from temporary database 900. The first instruction may comprise an automated instruction triggered by the control system configuration editor interface 1412, or may comprise a user or operator instruction received through the control system configuration editor interface 1412.

Responsive to the received first instruction, step 1604 comprises retrieving a first set of n data records or data rows from the original data table 902 together with reference data table 908 for grouping or ordering of data records or data rows stored within temporary database 900—and storing the retrieved first set of n data records within the internal cache memory 1407 within or communicably coupled with interface control server 1400. In an embodiment the number n is a preset or predefined number of data rows that can be viewed in each page of data rows displayed within the control system configuration editor interface 1412. So for example, in the exemplary illustration of FIG. 6, the number n may be set to represent 1000 data rows that may be viewed within a selected page within the control system configuration editor interface 1412.

Step 1606 comprises displaying the first set of n data records through the control system configuration editor interface 1412, such that the user or operator may navigate or view or modify one or more data records within the first set of n data records. The user may use horizontal or vertical scroll bars or other navigation control tools to navigate among the displayed n data records.

Thereafter, step 1608 comprises receiving through the control system configuration editor interface 1412, a second instruction to retrieve engineering data from temporary database 900. The second instruction may comprise a user or operator instruction received through the control system configuration editor interface 1412—for example through one or more page navigation controls, and may comprise an instruction to display a second set of n data records from within the engineering data stored in the temporary database 900.

Responsive to the received second instruction, step 1610 comprises retrieving a second set of n data records or data rows from the original data table 902 together with reference data table 908 for grouping or ordering of data records or data rows stored within temporary database 900—and storing the retrieved second set of n data records within the internal cache memory 1407 within or communicably coupled with interface control server 1400.

Step 1612 comprises displaying the second set of n data records through the control system configuration editor interface 1412, such that the user or operator may navigate, view or modify one or more data records within the second set of n data records.

The method of FIG. 16 enables optimized utilization of internal cache memory by loading engineering data from a temporary database 900, on-demand. As a result, the internal cache memory 1407 is not used to store engineering data that is not being used or viewed by a user or system operator. In other words, only the engineering data which is necessary to the user or operator's operation is loaded into the internal cache memory 1407—which results in reduced memory consumption for the current operation and increased availability of internal cache memory for other operations and applications.

Figure 17:
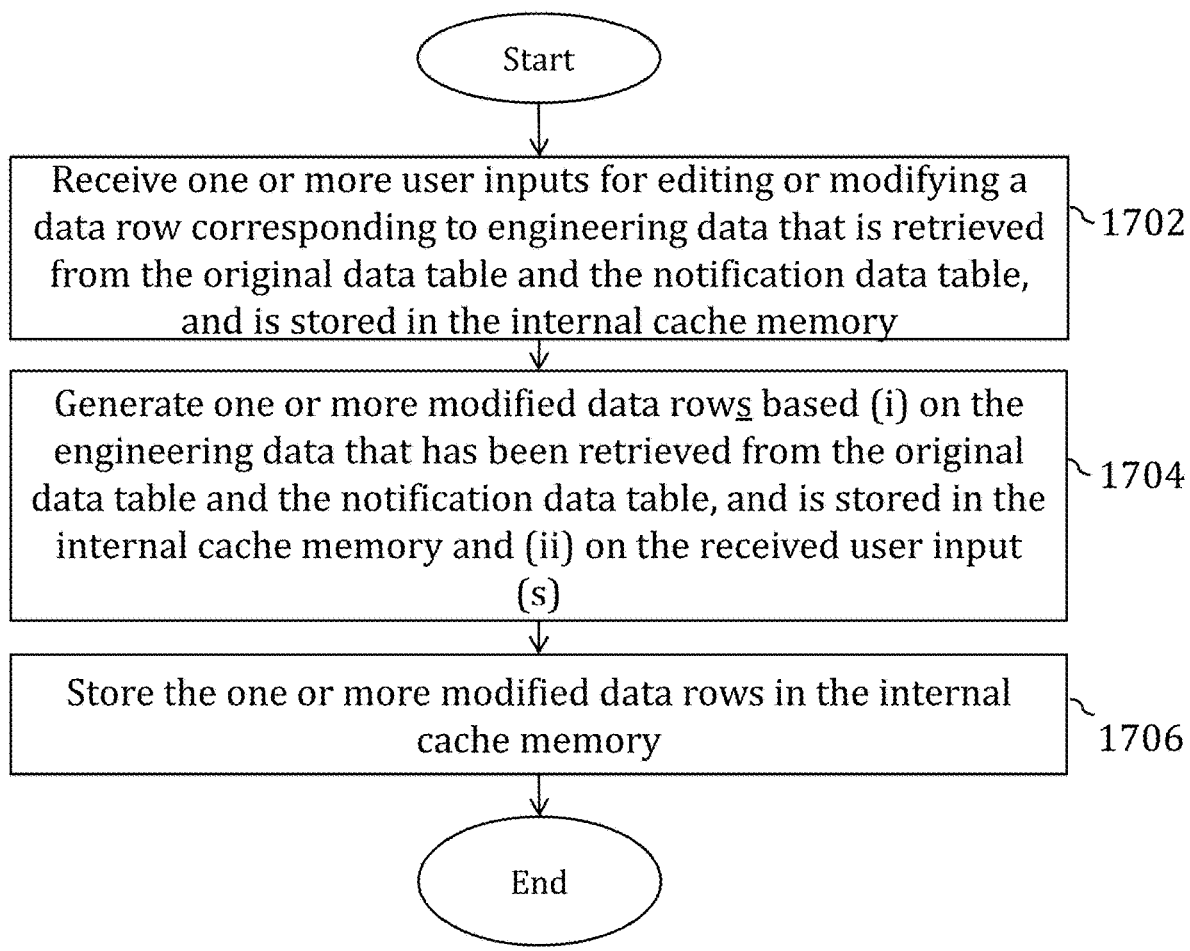
FIG. 17 is a flowchart illustrating a method of modifying engineering data in accordance with the teachings of the present invention.

Modifying Data Records Through the Control System Configuration Editor Interface FIG. 17 is a flowchart illustrating a method of modifying engineering data that has been retrieved from the original data table 902 stored within temporary database 900, and that has been stored in the internal cache memory 1407 within or communicably coupled with interface control server 1400 (i.e. engineering data that has been retrieved for display in accordance with the method of FIG. 16). In an embodiment, the method steps of FIG. 17 may be implemented within interface control server 1400, and in a more specific embodiment, may be implemented within control system configuration editor interface 1412.

Step 1702 comprises receiving one or more user or operator inputs for editing or modifying a data row or a data value within a data row that (i) comprises engineering data that has been retrieved from the original data table 902 and the notification data table 906 within temporary database 900, (ii) is stored within the internal cache memory of the interface control server 1400, and (iii) which has been displayed to the user or operator through the control system configuration editor interface 1412.

Step 1704 comprises generating one or more modified data rows that is based (i) on an original data row comprising engineering data that has been retrieved from the original data table 902 and the notification data table 906, and that is stored in the internal cache memory and (ii) on the received user input(s).

At step 1706, the generated one or more modified data rows is stored within the internal cache memory 1407. In an embodiment, the modified data row substitutes the original data row within the internal cache memory. In another embodiment, only the modified data values substitute the corresponding original data values within the original data row in the internal cache memory.

The objective of the method of FIG. 17 is to enable efficient synchronization of modified data from the internal cache memory 1407 to the temporary database 900, and also to enable efficient and quick retrieval of data values or data rows that have been modified, from the internal cache memory, without requiring to construct these data rows again. Since a current view of engineering data at a control system configuration editor interface 1412 may have been loaded with a new set of engineering data retrieved from the temporary database 900 for subsequent operations, the internal cache memory is used to stored modified data rows from previous operations before these modified data rows are synchronized or persisted to the temporary database.

It will be understood that modified engineering data stored in the internal cache memory 1407 may or may not be synchronized to the temporary database 900—and the decision on whether to trigger data synchronization from the internal cache memory 1407 to the temporary database 900 can be determined based on whether one or more predefined events or user actions or operator actions have been detected.

Figure 18:
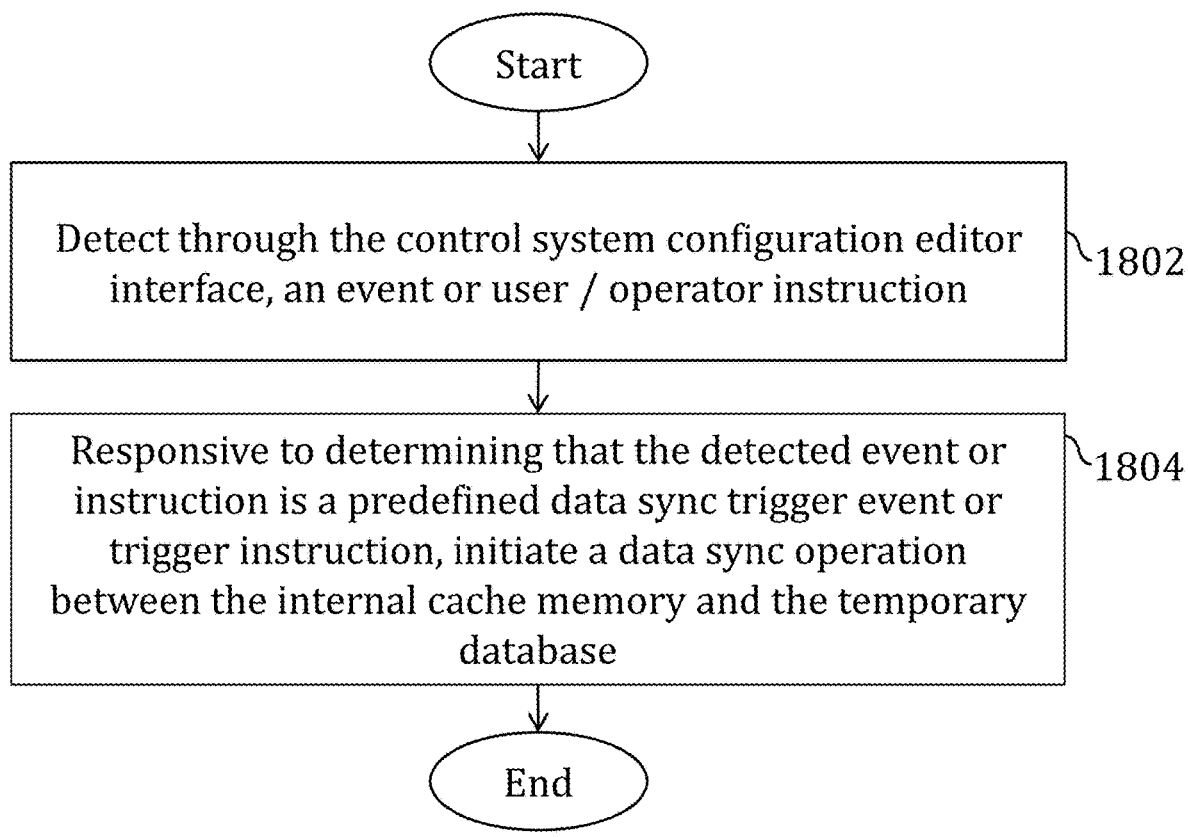
FIG. 18 is a flowchart illustrating a method of synchronizing modified engineering data stored in an internal cache memory with a temporary database.

Synchronizing Modified Data Records from an Internal Cache Memory to a Temporary Database FIG. 18 illustrates a method of synchronizing modified engineering data stored in the internal cache memory 1407 with the temporary database 900. The method steps of FIG. 18 may be implemented within an interface control server 1400, and in a particular embodiment, may be implemented within a data sync controller 1418 within the interface control server 1400.

Step 1802 comprises detecting an event or user/operator instruction associated with, or initiated at or through a control system configuration editor interface 1412.

The detected event or instruction is analysed, and responsive to determining that the detected event or instruction comprises a predefined data synchronization trigger event or a data synchronization trigger instruction, step 1804 comprises initiating a data synchronization operation between the internal cache memory 1407 and the temporary database. The data synchronization operation at step 1804 comprises writing to the temporary database, some or all data values or data rows of engineering data that have been modified through the control system configuration editor interface 1412 subsequent to the immediately previous data synchronization operation from the internal cache memory 1407 to the temporary database.

In an embodiment of the invention, the data synchronization operation at step 1804 comprises synchronizing the modified data rows within the internal cache memory 1407 to the modified data table 904 within the temporary database 900.

In an embodiment of the method of FIG. 18, the predefined data synchronization trigger event or a trigger instruction of step 1804 may comprise any of (i) a view refresh instruction, (ii) a page navigation instruction comprising selection of any of the control for loading the first page of data rows within a set of engineering data, the control for loading the immediately preceding page of data rows within a set of engineering data, the control for loading the immediately successive page of data rows within a set of engineering data, and the control for loading the last page of data rows within a set of engineering data, from among the available page navigation controls, (iii) an instruction to go to a specific page of data rows within a set of engineering data, using the page number selection page navigation control, (iv) an instruction to sort a view of data rows within the control system configuration editor interface 1412 (for example, sort by ascending order, descending order, whether content includes a particular item of engineering data or any other sorting order or sorting criteria), (v) an instruction for filtering a view of data rows within the control system configuration editor interface 1412, (vi) an instruction to search an available view of data rows within the control system configuration editor interface 1412, (vii) an instruction for switching the control system configuration editor interface 1412 from one of a "normal" view mode and a "modified only" to the other of said modes and/or (viii) any other predefined data operations or instructions, such as instructions for data import, data export, grid rule, etc.

By updating the modified data table 904 within temporary database 900 with modified data values or data rows from the internal cache memory 1407 prior to performing or implementing any of the above events or instructions, the method of FIG. 18 ensures that the modified data values or data rows from the internal cache memory 1407 are not lost as a result of implementing the event or instruction. Additionally, since modified data is not immediately synchronized between the internal cache memory 1407 and the temporary database 900, and is instead only synchronized before implementing a detected trigger event, the method of FIG. 18 reduces the overhead of accessing the temporary database after each change (e.g. the overhead associated with opening the temporary database 900, updating values in a data table, and closing the temporary database 900). By defining as trigger events, only those events that require retrieval of data from the temporary database 900, the method of FIG. 18 can effectively minimize the overhead of accessing the temporary database for updating modified data.

Figure 19:
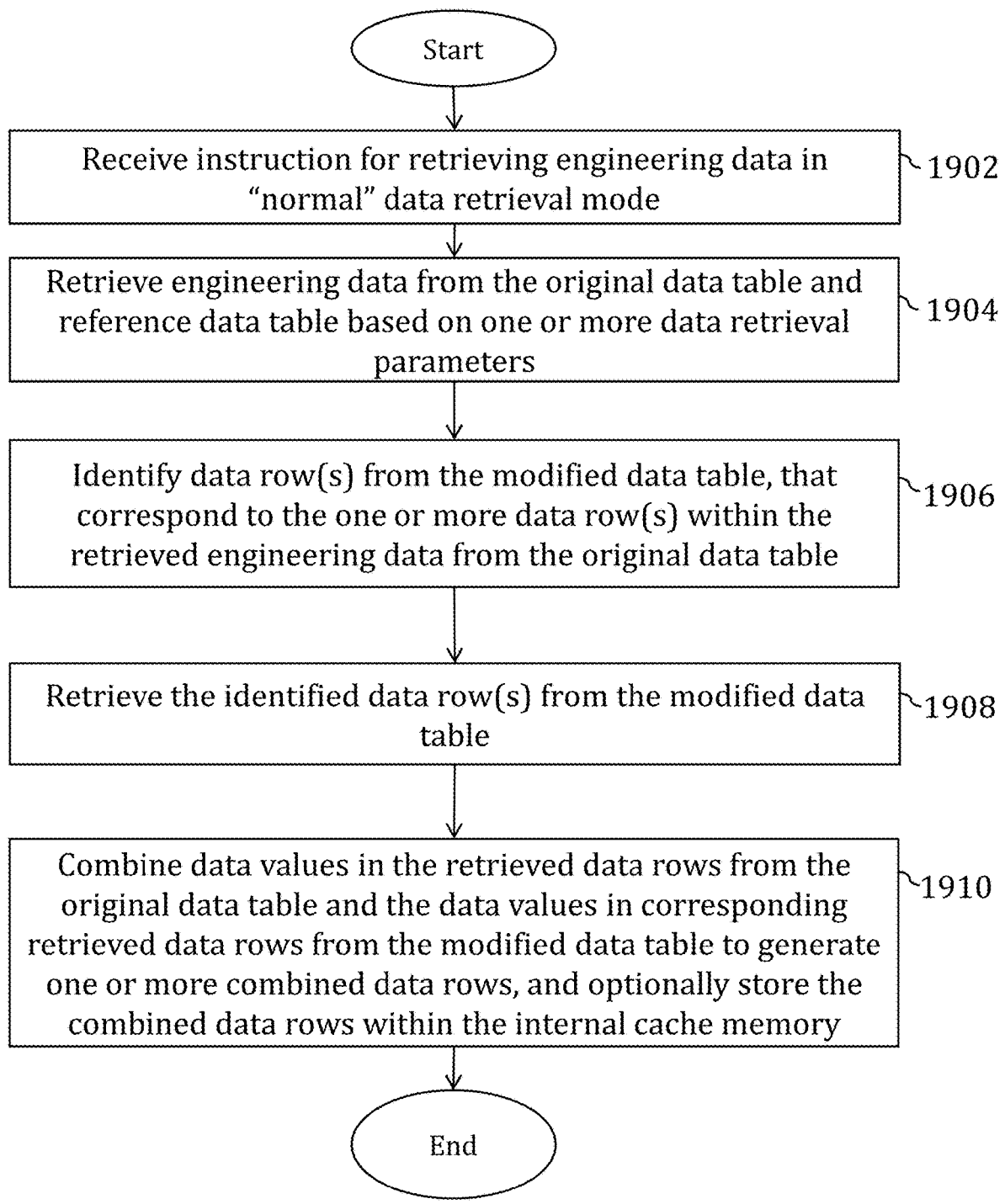
FIG. 19 is a flowchart illustrating a method for retrieving data from a temporary database and storing the data in an internal cache memory when a control system configuration editor interface is operating in "normal" view mode.

Data Retrieval from Temporary Database to Internal Cache Memory in "Normal" Mode FIG. 19 illustrates a method for retrieving data from the temporary database 900 into the internal cache memory 1407 when the control system configuration editor interface 1412 is operating in "normal" view mode i.e. is operating in a view mode that displays both modified as well as non-modified data values or data rows of engineering data. The method of FIG. 19 may be implemented within the interface control server 1400, and in a particular embodiment may be implemented by temporary database interface 1414.

Step 1902 comprises receiving an instruction for retrieving engineering data in a "normal" view mode (i.e. a first data retrieval mode). The instruction may be received from a user or system operator through the control system configuration editor interface 1412. In an embodiment, the instruction may comprise an instruction for any of a refresh a view, move page, sort a view (e.g. descending, ascending), filter a view, or search operation.

Step 1904 comprises retrieving engineering data from the original data table 902 together with reference data table 908 for grouping or ordering of data records or data rows stored within a temporary database 900, based on one or more data retrieval parameters associated with the instruction received at step 1902. It would be understood that retrieval of data from the temporary database 900 is significantly more efficient than having to parse and retrieve engineering data from a plurality of engineering data files stored in an external engineering data repository 802 (from which engineering data has been retrieved to generate the temporary database 900).

Step 1906 comprises parsing data rows within the modified data table 904 within the temporary database 900 and identifying one or more data row(s) of modified engineering data that correspond to the one or more of the data row(s) within the engineering data that has been retrieved from the original data table 902 (at step 1904). The step of identifying data rows in the modified data table 904 that correspond to the data rows retrieved from the original data table 902 may be implemented by matching one or more unique key identifiers (e.g. an Alarm Attribute Identifier) associated with the engineering data in both the original data table 902 and the modified data table 904.

Step 1908 comprises retrieving from the modified data table 904, the one or more data rows that have been identified at step 1906 as having a unique key identifier that matches a unique key identifier of a data row retrieved from the original data table at step 1904.

Step 1910 comprises combining the data values within the retrieved data rows from the original data table 902 (retrieved at step 1904) and associated data values within the corresponding retrieved data rows from the modified data table 904 (retrieved at step 1906) to generate one or more combined data rows, and the combined data rows may be optionally stored within the internal cache memory 1407 for the purposes of viewing/editing through the control system configuration editor interface 1412.

As a result of implementation of the method of FIG. 19, the data retrieved and stored within the internal cache memory 1407 for the purposes of viewing/editing through the control system configuration editor interface 1412 reflects or represents the engineering data in the form that has been most recently updated—and includes the current set of modified data values as well as non-modified (or non-modifiable) data values.

Figure 20:
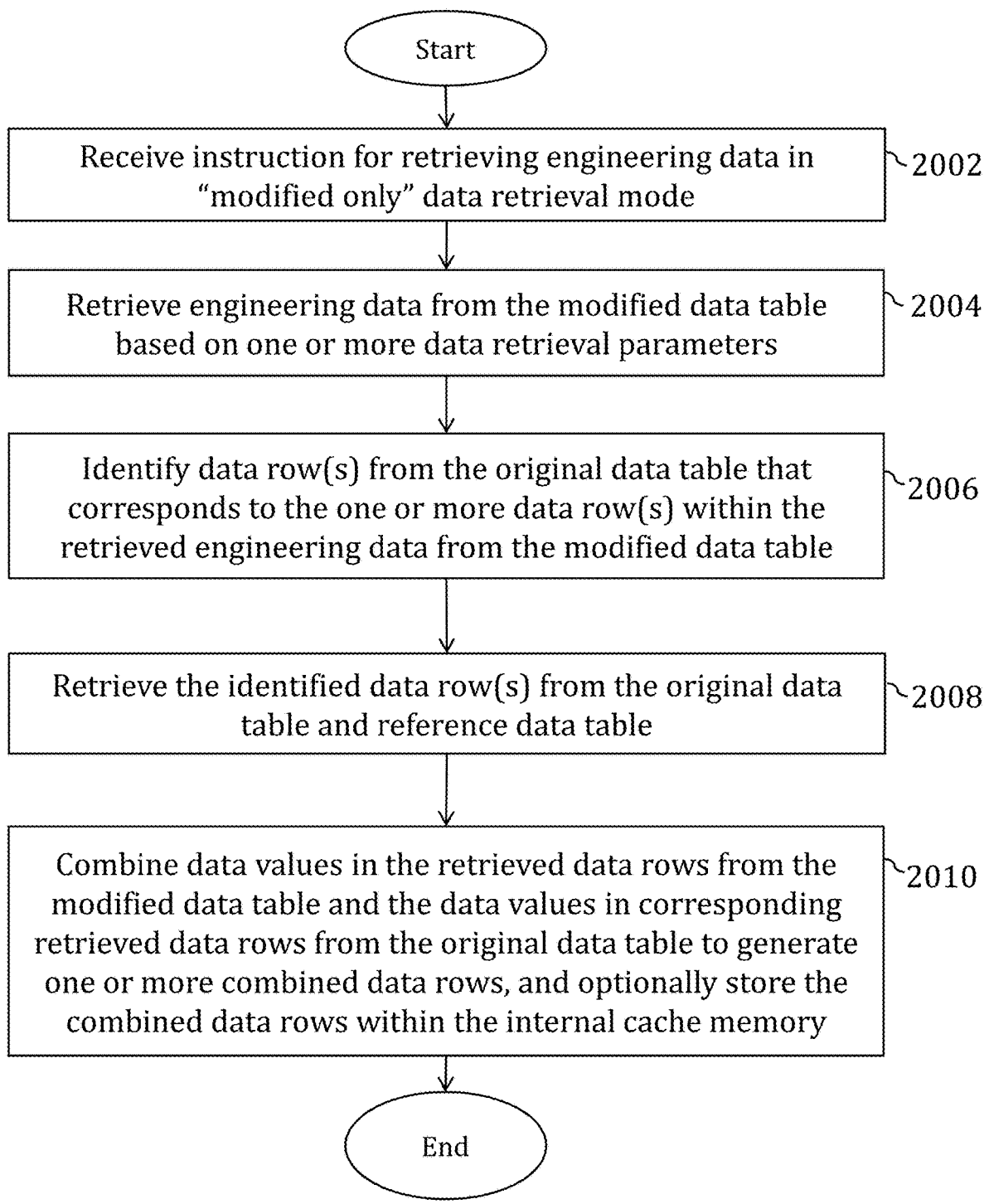
FIG. 20 is a flowchart illustrating a method for retrieving data from a temporary database and storing the data in an internal cache memory when a control system configuration editor interface is operating in "modified only" view mode.

Data Retrieval from Temporary Database to Internal Cache Memory in "Modified Only" Mode FIG. 20 illustrates a method for retrieving data from the temporary database 900 into the internal cache memory 1407 when the control system configuration editor interface 1412 is operating in "modified only" view mode i.e. is operating in a view mode that displays only modified data rows of engineering data. The method of FIG. 20 may be implemented within the interface control server 1400, and in a particular embodiment may be implemented by temporary database interface 1414.

Step 2002 comprises receiving an instruction for retrieving engineering data in "modified only" view mode (i.e. a second data retrieval mode). The instruction may be received from a user or system operator through the control system configuration editor interface 1412. In an embodiment, the instruction may comprise an instruction for any of a refresh a view, move page, sort a view (e.g. descending, ascending), filter a view, or search operation.

Step 2004 comprises retrieving engineering data from the modified data table 904 within a temporary database 900, based on one or more data retrieval parameters associated with the instruction received at step 2002. It would be understood that retrieval of modified data from the modified data table 904 is significantly more efficient than having to parse all engineering data within the original data table, identify data values that have been modified and extracting only those data values.

Step 2006 comprises parsing data rows within the original data table 902 within the temporary database 900 and identifying one or more data row(s) of engineering data that correspond to one or more of the data row(s) within the engineering data that has been retrieved from the modified data table 904 (at step 2004). The step 2006 of identifying data rows in the original data table 902 that correspond to data rows retrieved from the modified data table 904 may be implemented by matching one or more unique key identifiers (e.g. an Alarm Attribute Identifier) associated with the engineering data in both the modified data table 904 and the original data table 902.

Step 2008 comprises retrieving from the original data table 902 together with reference data table 908 for grouping or ordering of data records or data rows stored within a temporary database 900, the one or more data rows that have been identified at step 2006 as having a unique key identifier that matches a unique key identifier of a data row retrieved from the modified data table at step 2004.

Step 2010 comprises combining data values within the retrieved data rows from the modified data table 904 (retrieved at step 2004) and associated data values within the corresponding retrieved data rows from the original data table 902 (retrieved at step 2006) to generate one or more combined data rows, and the combined data rows may be optionally stored within the internal cache memory 1407 for the purposes of viewing/editing through the control system configuration editor interface 1412.

As a result of implementation of the method of FIG. 20, the data retrieved and stored within the internal cache memory 1407 for the purposes of viewing/editing through the control system configuration editor interface 1412 reflects or represents only such data rows within the engineering data that has been updated or modified—and includes for the modified data rows, both the modified data values as well as the non-modified (or non-modifiable) data values. A user or operator can use the "modified only" view mode to conveniently view only the data rows that have been updated or modified since the last save or persist instruction has been executed.

Storage of Data Retrieved from Temporary Database within Internal Cache Memory

Figure 21:
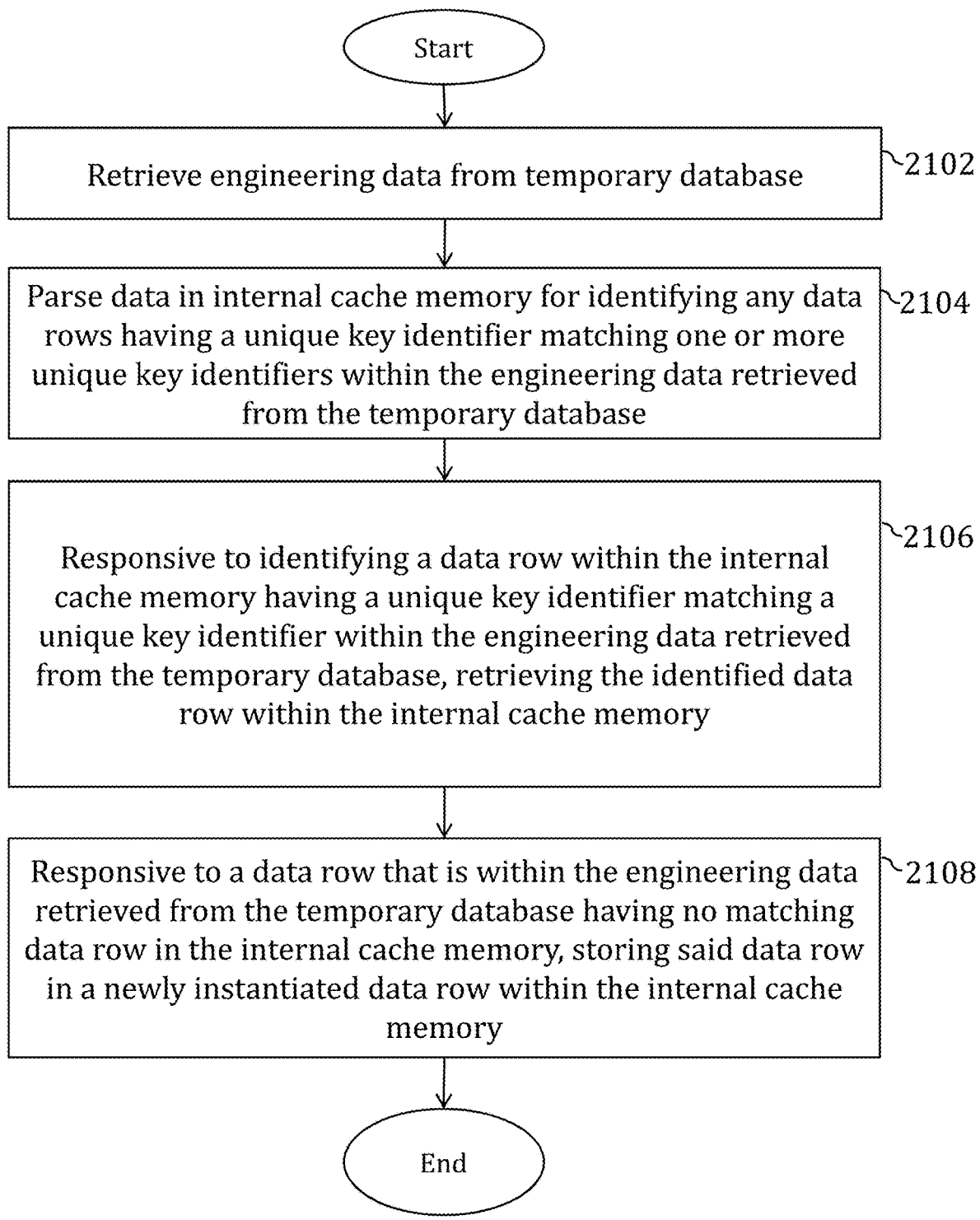
FIG. 21 is a flowchart illustrating a method for storing engineering data retrieved from a temporary database within an internal cache memory in accordance with the teachings of the present invention.

Upon retrieval of engineering data from the temporary database 900 for generating a current view of engineering data within the control system configuration editor interface 1412 (for example, in accordance with the methods of FIG. 19 or 20 described above), the retrieved engineering data may be stored within the internal cache memory 1407 within or coupled with interface control server 1400 in accordance with the method of FIG. 21. The method of FIG. 21 may be implemented within the interface control server 1400, and in a particular embodiment may be implemented by the internal cache memory interface 1416.

Step 2102 comprises retrieving engineering data from the temporary database 900. The engineering data may comprise one or more data rows retrieved from the temporary database 900 in accordance with the methods of either of FIG. 19 or 20.

Step 2104 comprises parsing data stored within the internal cache memory 1407 for identifying any previously stored data rows having a unique key identifier (for example, an Alarm Attribute Identifier) that matches one or more unique key identifiers corresponding to data rows within the engineering data that has been retrieved from the temporary database 900.

Responsive to identifying a previously stored data row within the internal cache memory 1407 that has a unique key identifier which matches a unique key identifier corresponding to engineering data retrieved from the temporary database 900, step 2106 comprises retrieving the identified previously stored data row from within the internal cache memory and storing one or more data values from the corresponding data row that has been matched within the engineering data retrieved from the temporary database, instead of constructing a new data row to store (within the internal cache memory 1407) the data row of engineering data that has been retrieved from the temporary database 900.

Responsive to determining that a data row that is part of the engineering data retrieved from the temporary database 900 has no matching data row in the internal cache memory 1407 (i.e. determining that the unique key identifier corresponding to the data row within the engineering data retrieved from the temporary database 900 does not match the unique key identifier(s) corresponding to any of the previously stored data rows within the internal cache memory 1407), step 2108 comprises instantiating a new data row within the internal cache memory 1407 and using the instantiated new data row to store the data row that has been retrieved from the temporary database 900.

It would be understood that implementing the method of FIG. 21 for selectively instantiating new data rows for storing engineering data within the internal cache memory 1407 only if a data row for such engineering data does not already exist in the internal cache memory 1407, provides significant optimizations in memory utilization over the prior art solutions where new data rows were instantiated within the internal cache memory for every data row retrieved from engineering data files, regardless of whether such data rows were already stored within the internal cache memory.

Writing Data from the Internal Cache Memory to the Temporary Database

Figure 22:
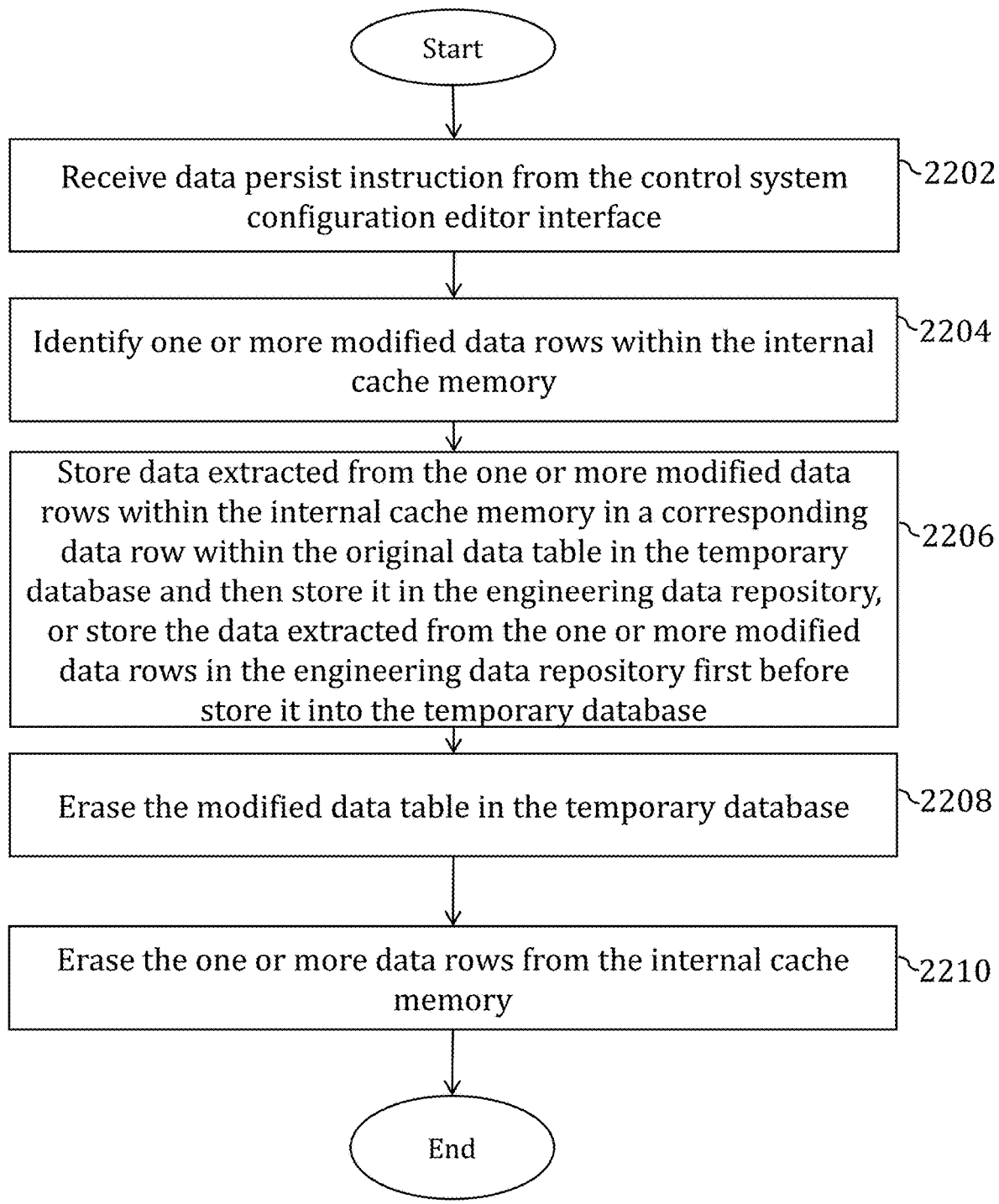
FIG. 22 is a flowchart illustrating a method of writing engineering data that is stored within an internal cache memory, to a temporary database, in accordance with the teachings of the present invention.

FIG. 22 is a flowchart illustrating a method of writing engineering data that is stored within the internal cache memory 1407 within or coupled with the control system configuration editor interface 1412 to the temporary database 900. The method of FIG. 22 may be implemented within the interface control server 1400, and in a particular embodiment may be implemented by the data sync controller 1418.

Step 2202 comprises receiving a data persist instruction or a data save instruction from the control system configuration editor interface 1412. The data persist or data save instruction may be provided by a user or operator for saving or persisting the configured or modified engineering data that is part of the displayed view (within the control system configuration editor interface 1412).

Step 2204 comprises identifying one or more modified data rows within the internal cache memory 1407. In an embodiment, the one or more modified data rows within the internal cache memory 1407 may be identified based on a status indicator corresponding to each row which is configured to indicate whether the corresponding data row has been modified or not. In one embodiment, the status indicator may be retrieved from internal cache memory 1407. In another embodiment, the status indicator may be retrieved from within the modified data table 904.

Thereafter, step 2206 comprises storing data extracted from the one or more modified data rows within the internal cache memory 1407. In a first embodiment, step 2206 comprises storing data extracted from the one or more modified data rows within the internal cache memory 1407, first in a corresponding data row within the original data table 902 in the temporary database 900, and thereafter in the engineering data repository 802. In a second embodiment, step 2206 comprises storing data extracted from the one or more modified data rows within the internal cache memory 1407 first in the engineering data repository 802, and thereafter in a corresponding data row within the original data table 902 in the temporary database 900. In certain implementations, the second embodiment is preferred over the first embodiment, for the reason that the engineering data repository is a higher priority repository than temporary database 900 in such implementations.

The concept of the engineering data repository being a "higher priority repository" than temporary database 900, may be understood as follows. The engineering data repository may generally be understood as a central database to store engineering data. For as long as data stored in the engineering data repository is correct and updated, data integrity of such data can be ensured—and even if a temporary database 900 is corrupted, the engineering data can still be obtained from the engineering data repository. On the other hand the temporary database 900 is only a temporary repository for storing the engineering data. Therefore, in the overall scheme of reliability and importance, the engineering data repository is therefore a higher priority database (i.e. a database that is more important) than temporary database 900.

Step 2208 comprises deleting or erasing data within the modified data table 904 in the temporary database 900. Step 2210 comprises deleting or erasing the one or more data rows from the internal cache memory 1407 as well.

It would be understood that as a result of implementing the method of FIG. 22, data values or data rows that have been modified within the internal cache memory 1407 are written or persisted to the original data table 902 within the temporary database 900, and to the engineering data repository 802. This ensures that the original data table 902 and/or the engineering data repository 802 contains the latest configured or modified engineering data set, which can be used as a data source for subsequent operations. This ensures that modifications to engineering data made by the user or operator are saved. By deleting data within the modified data table 904 and the internal cache memory 1407 after completing the data save or data persist operations, the method ensures that the original data table 902 and/or the engineering data repository 802 may be treated as the most current state of engineering data for future data view operations.

Updating Reference Engineering Data to the Temporary Database

Figure 23:
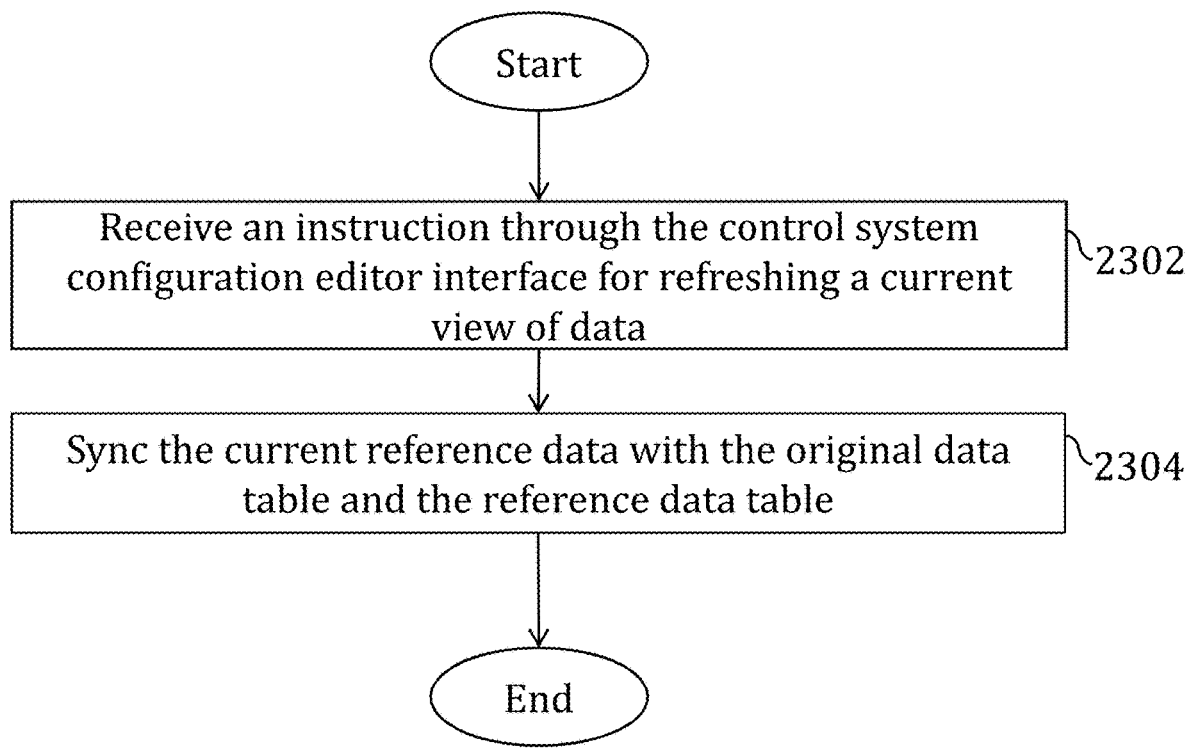
FIG. 23 is a flowchart illustrating a method of writing modifications or changes to reference engineering data to the temporary database, in accordance with the teachings of the present invention.

FIG. 23 is a flowchart illustrating a method of updating modifications or changes to reference engineering data to the temporary database 900. The method of FIG. 23 may be implemented within the interface control server 1400, and in a particular embodiment may be implemented by data sync controller 1418.

It would be understood that other users or operators may update engineering data from other locations or from other engineering sites. In such cases, reference engineering data (for example, alarm engineering data, modules information, engineering project information, module binding information, etc.) are required to be updated in the temporary database 900. This is to ensure that the view (within the control system configuration editor interface 1412) displays the latest engineering data to users or operators for configuration or operation. During a refresh operation of the current view, reference engineering data is therefore synced or updated to the original data table 902 and the reference data table 908. If there is any new alarm engineering data (for example, new alarm settings or new module information), this new engineering data set is added to or inserted within the original data table 902 and the reference data table 908.

Step 2302 of the method comprises receiving an instruction through the control system configuration editor interface 1412 for refreshing a current view of engineering data.

Thereafter, step 2304 comprises synchronizing the current reference data with the original data table 902 and the reference data table 908.

Implementing the method of FIG. 23 ensures that control system configuration editor interface 1412 can display the latest engineering data to users or operators for configuration or operation.

Memory Management

Figure 24:
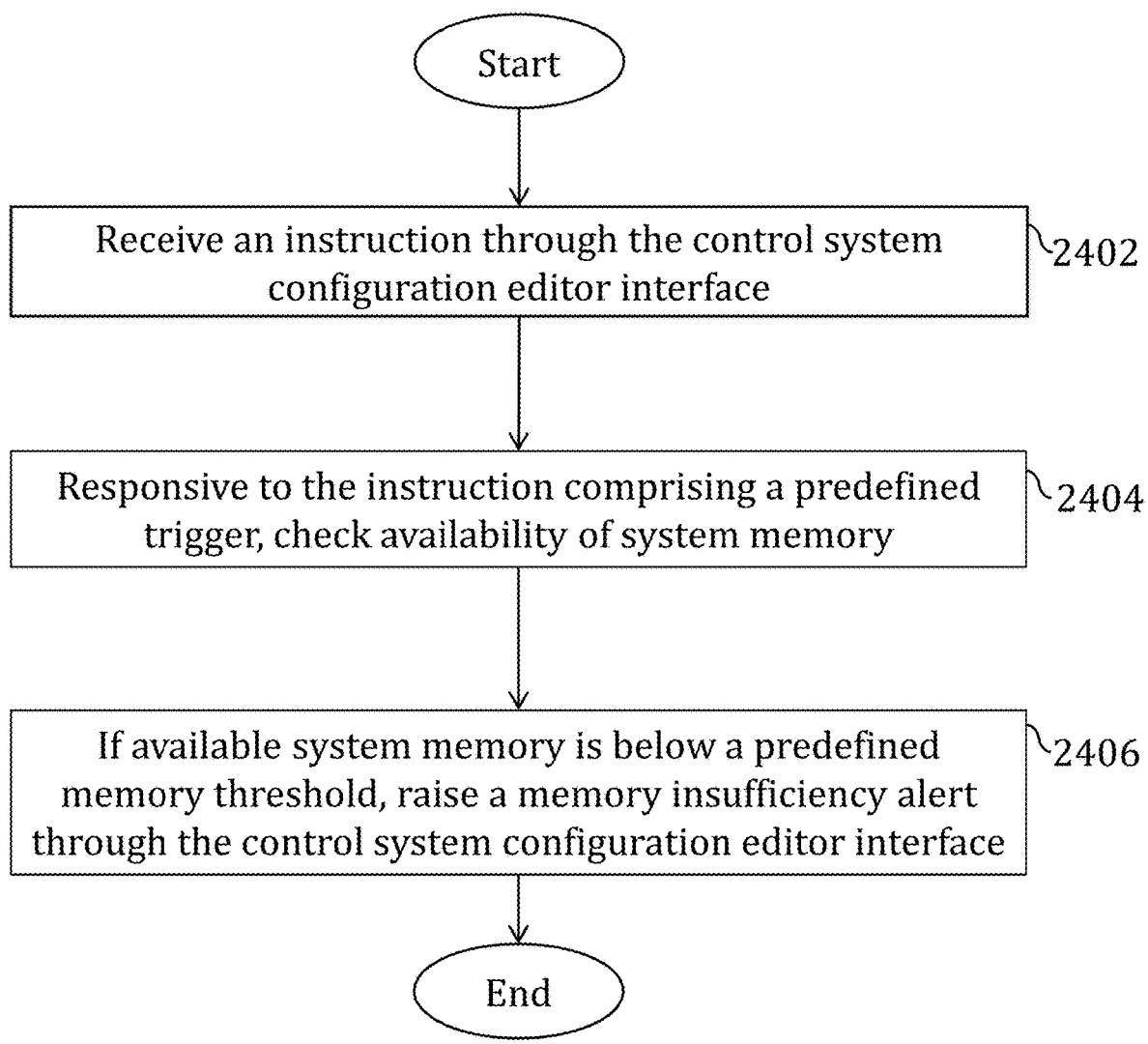
FIG. 24 is a flowchart illustrating a method for memory management, in accordance with the teachings of the present invention.

The invention additionally provides methods for monitoring a state of available memory within interface control server 1400, and for raising "insufficient memory" alerts in response to detecting an insufficient memory event. FIG. 24 is a flowchart illustrating a method for memory management. The method of FIG. 24 may be implemented within interface control server 1400, and in an embodiment may be implemented by a memory handler controller 1424.

Step 2402 comprises receiving an instruction through the control system configuration editor interface 1412. In an embodiment, the instruction may comprise an instruction for any of a refresh a view, move page, sort a view, filter a view, or search operation.

Responsive to the instruction comprising a predefined memory check trigger instruction, step 2404 comprises checking the availability of system memory (i.e. the availability of free system memory within interface control server 1400).

At step 2406, if the available or free system memory is lower than a predefined memory threshold, a memory insufficiency alert (i.e. an "insufficient memory" alert) is generated and communicated through the control system configuration editor interface 1412.

As a result of the method of FIG. 24, when a user or operator performs an operation which requires the interface control server 1400 to synchronize modified data and retrieve new sets of engineering data from the temporary database 900 (for example, any of refresh, move page or sort or filter or search operations), the interface control server 1400 internally checks the availability of system memory (i.e. the availability of free system memory within interface control server 1400) against a predefined or minimum amount of free memory (for example, 1 GB) that requires to be maintained for functioning of the control system configuration editor interface 1412. If the available free system memory is lower than this predefined amount of free memory, the interface control server 1400 may discard the requested operation and may display an "insufficient memory" warning message. This allows the user or operator to verify the already configured (modified) engineering data and provides an opportunity to save the engineering data if required—for example by prompting the user or operator to save the modified configuration/engineering data in order to release the internal cache memory 1407 and to eliminate inadvertent loss of modified data.

Implementing the method of FIG. 24 ensures the integrity of engineering data and improves overall system reliability. It also prevents unexcepted failures due to unforeseen or unexpected lack of system memory.

Deleting the Temporary Database

Figure 25:
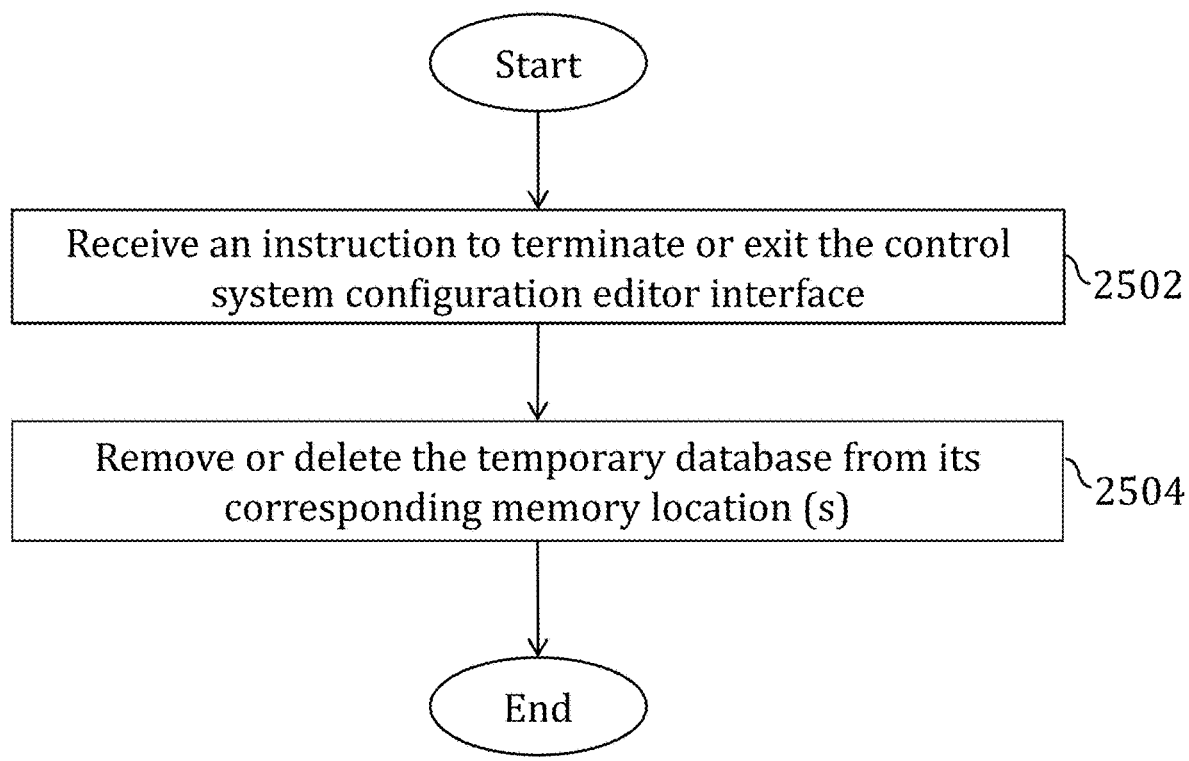
FIG. 25 is a flowchart illustrating a method of removing or deleting a temporary database, in accordance with the teachings of the present invention.

FIG. 25 is a flowchart illustrating a method of removing or deleting the temporary database 900. The method of FIG. 25 may be implemented within interface control server 1400, and in an embodiment may be implemented by the temporary database interface 1414.

Step 2502 comprises receiving an instruction to terminate or exit or inactivate the control system configuration editor interface 1412.

Step 2504 thereafter comprises removing or deleting the temporary database 900 from its corresponding memory location(s).

It would be understood that as a result of implementing the method of FIG. 25, when the control system configuration editor interface 1412 is terminated, closed, or inactivated, the temporary database 900 is removed or deleted from the system defined memory location(s). This enables the control system configuration editor interface 1412 to use the available memory for other purposes while the engineering data viewing or editing functionality is inactive.

Figure 26:
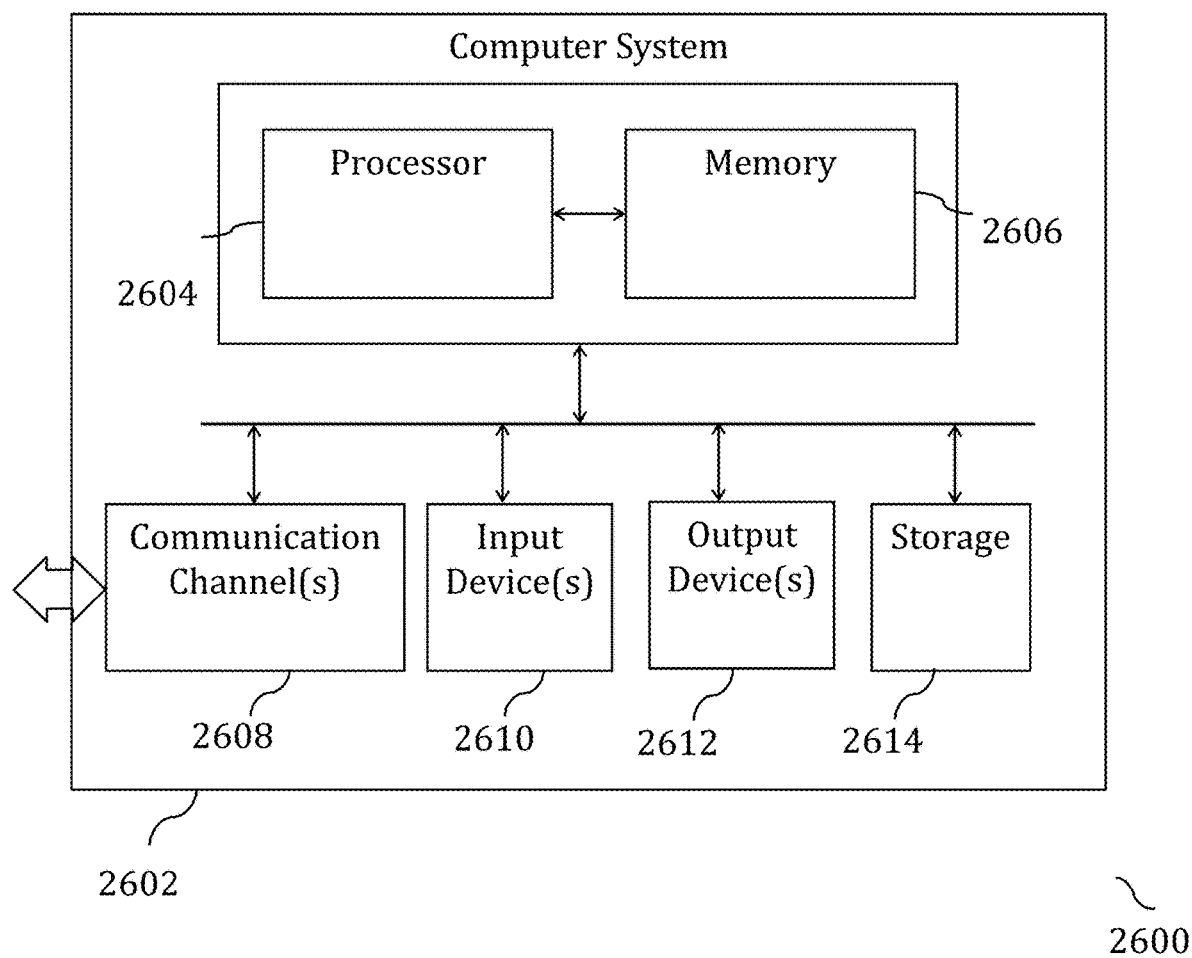
FIG. 26 illustrates an exemplary computer system according to which various embodiments of the present invention may be implemented.

FIG. 26 illustrates an exemplary computer system according to which various embodiments of the present invention may be implemented.

System 2600 includes computer system 2602 which in turn comprises one or more processors 2604 and at least one memory 2606. Processor 2604 is configured to execute program instructions—and may be a real processor or a virtual processor. It will be understood that computer system 2602 does not suggest any limitation as to scope of use or functionality of described embodiments. The computer system 2602 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 2602 in accordance with the present invention may include one or more servers, desktops, laptops, tablets, smart phones, mobile phones, mobile communication devices, tablets, phablets and personal digital assistants. In an embodiment of the present invention, the memory 2606 may store software for implementing various embodiments of the present invention. The computer system 2602 may have additional components. For example, the computer system 2602 may include one or more communication channels 2608, one or more input devices 2610, one or more output devices 2612, and storage 2614. An interconnection mechanism (not shown) such as a bus, controller, or network, interconnects the components of the computer system 2602. In various embodiments of the present invention, operating system software (not shown) provides an operating environment for various softwares executing in the computer system 2602 using a processor 2604, and manages different functionalities of the components of the computer system 2602.

The communication channel(s) 2608 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 2610 may include, but is not limited to, a touch screen, a keyboard, mouse, pen, joystick, trackball, a voice device, a scanning device, or any another device that is capable of providing input to the computer system 2602. In an embodiment of the present invention, the input device(s) 2610 may be a sound card or similar device that accepts audio input in analog or digital form. The output device(s) 2612 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 2602.

The storage 2614 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 2602. In various embodiments of the present invention, the storage 2614 may contain program instructions for implementing any of the described embodiments.

In an embodiment of the present invention, the computer system 2602 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 2602. The method described herein is typically implemented as a computer program product, comprising a set of program instructions that is executed by the computer system 2602 or any other similar device. The set of program instructions may be a series of computer readable codes stored on a tangible medium, such as a computer readable storage medium (storage 2614), for example, diskette, CD-ROM, ROM, flash drives or hard disk, or transmittable to the computer system 2602, via a modem or other interface device, over either a tangible medium, including but not limited to optical or analogue communications channel(s) 2608. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it would be apparent that the present invention offers significant advantages—including:

enabling configuring and engineering large amounts of control system data with an efficient navigation control,
improving memory usage and performance efficiency,
increasing usability and reliability,
enabling a user or operator to configure or prepare large amounts of engineering data without having to limit or filter the data, and without having to sacrifice memory or performance of the system,
improving performance and memory usage of the interface control server by loading only such data that is necessary for a current view,
improving the usability of the engineering data viewer or editor by enabling on-demand page navigation controls, which reduces risks and user mistakes typically associated with configuring large amounts of engineering data within a single view,
enabling a "modified only" view mode so that a user or operator can readily pull up or view engineering data that has been modified, without having to review all engineering data records,
enabling a user or operator to configure the number of data records that can be viewed within a single page view, and
reducing or eliminating the likelihood of unexpected failures due to a lack of system memory—which in turn increases system reliability and data integrity.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

The invention claimed is:

1. A method for managing control system engineering data through a processor implemented interface control server, the method comprising implementing at the interface control server the steps of:

receiving one or more data retrieval parameters for retrieval of engineering data from one or more engineering data repositories;
instantiating a temporary database, wherein instantiating the temporary database includes:
  instantiating an original data table within the temporary database; and
  instantiating a modified data table within the temporary database;
retrieving a set of engineering data from the one or more engineering data repositories, wherein retrieval of the set of engineering data is based on the one or more data retrieval parameters;
storing the set of engineering data in the temporary database, within the original data table; and
responsive to an instruction to display a first sub-set of engineering data from within the set of engineering data stored within the temporary database, retrieving the first sub-set of engineering data from the original data table within the temporary database;
storing the first sub-set of engineering data within an internal cache memory that is coupled with the interface control server; and
displaying the first sub-set of engineering data on a display device, wherein the first sub-set of engineering data is retrieved for display, from the internal cache memory,
wherein the interface control server responds to receiving an instruction for retrieving engineering data from the temporary database by implementing the steps of:
  retrieving engineering data from the temporary database;
  parsing data within the internal cache memory for identifying any previously stored data rows having a key identifier that matches a key identifier corresponding to a data row within the engineering data retrieved from the temporary database; and
  responsive to identifying a previously stored data row within the internal cache memory that has a key identifier that matches a key identifier corresponding to a data row within the engineering data retrieved from the temporary database, retrieving the identified previously stored data row from within the internal cache memory and storing, within the retrieved previously stored data row, one or more data values from within the matched data row from the engineering data retrieved from the temporary database.

2. The method as claimed in claim 1, wherein responsive to an instruction to display a second sub-set of engineering data from within the set of engineering data stored within the temporary database, the interface control server:
   retrieves the second sub-set of engineering data from the original data table within the temporary database;
   stores the second sub-set of engineering data within the internal cache memory;
   displays the second sub-set of engineering data on the display device, wherein the second sub-set of engineering data is retrieved for display, from the internal cache memory; and
   deletes the first sub-set of engineering data from the internal cache memory.

3. The method as claimed in claim 1, wherein instantiating the temporary database includes implementing at the interface control server, the steps of:
   instantiating a notification data table within the temporary database and storing notification data retrieved from the engineering data repositories within the notification data table, wherein the notification data correlates a plurality of engineering data records that require to be edited or updated together; or
   instantiating a reference data table within the temporary database and storing reference data retrieved from the engineering data repositories within the reference data table, wherein the reference data comprises information that enables grouping or ordering of data rows for the purpose of display.

4. The method as claimed in claim 1, further comprising implementing at the interface control server, the steps of:
   receiving user input identifying a modification to a data value within a displayed data row that comprises engineering data stored in the internal cache memory;
   generating one or more modified data rows based on the received user input and on the engineering data corresponding to the displayed data row that is stored in the internal cache memory;
   storing the one or more modified data rows in the internal cache memory; and
   responsive to detection of a data synchronization trigger event, initiating a data synchronization operation between the internal cache memory and the temporary database, wherein the data synchronization operation comprises writing data values that have been modified subsequent to an immediately previous data synchronization operation, from the internal cache memory to the modified data table within the temporary database.

5. The method as claimed in claim 1, wherein the interface control server responds to receiving an instruction for retrieving engineering data from the temporary database in a first data retrieval mode, by implementing the steps of:
   retrieving engineering data from the original data table based on one or more data retrieval parameters;
   identifying a second set of data rows within the modified data table that correspond to a first set of data rows within the engineering data that has been retrieved from the original data table based on the one or more data retrieval parameters;
   retrieving the identified second set of data rows from the modified data table;
   combining the data values within the first set of data rows and associated data values within the second set of data rows to generate one or more combined data rows; and
   storing the generated combined data rows in the internal cache memory for display on the display device.

6. The method as claimed in claim 1, wherein the interface control server responds to receiving an instruction for retrieving engineering data from the temporary database in a second data retrieval mode, by implementing the steps of:
   retrieving engineering data from the modified data table based on one or more data retrieval parameters;
   identifying a second set of data rows within the original data table that correspond to a first set of data rows within the engineering data that has been retrieved from the modified data table based on the one or more data retrieval parameters;
   retrieving the identified second set of data rows from the original data table;
   combining the data values within the first set of data rows and associated data values within the second set of data rows to generate one or more combined data rows; and
   storing the generated combined data rows in the internal cache memory for display on the display device.

7. The method as claimed in claim 1, wherein the interface control server responds to receiving the instruction for retrieving engineering data from the temporary database, by implementing the steps of:
   responding to a determination that the key identifier corresponding to the data row within the engineering data retrieved from the temporary database does not match key identifier(s) corresponding to any of the previously stored data rows within the internal cache memory, by implementing the steps of:
      instantiating a new data row within the internal cache memory; and
      storing, within the instantiated new data row, the data row within the engineering data that has been retrieved from the temporary database.

8. The method as claimed in claim 1, wherein the interface control server responds to receiving an instruction for persisting data, by implementing the steps of:
   identifying one or more modified data rows within the internal cache memory;
   storing data values extracted from the identified one or more modified data rows in a corresponding data row within the original data table in the temporary database;
   deleting the modified data table in the temporary database; and
   deleting the identified one or more modified data rows from the internal cache memory.

9. The method as claimed in claim 8, wherein the step of storing data values extracted from the identified one or more modified data rows in a corresponding data row within the original data table in the temporary database is:
   succeeded by the step of storing the data values extracted from the identified one or more modified data rows, in an engineering data repository; or
   preceded by the step of storing the data values extracted from the identified one or more modified data rows, in an engineering data repository.

10. The method as claimed in claim 1, wherein the interface control server responds to receiving a predefined trigger instruction by implementing the steps of:
   checking the amount of free system memory within the interface control server; and
   responsive to the free system memory being less than a predefined threshold value, generating an insufficient memory alert through the interface control server.

11. A system for managing control system engineering data through a processor implemented interface control server, the system comprising:
a processor implemented interface control server configured for:
receiving one or more data retrieval parameters for retrieval of engineering data from one or more engineering data repositories;
instantiating a temporary database, wherein instantiating the temporary database includes:
instantiating an original data table within the temporary database; and
instantiating a modified data table within the temporary database;
retrieving a set of engineering data from the one or more engineering data repositories, wherein retrieval of the set of engineering data is based on the one or more data retrieval parameters;
storing the set of engineering data in the temporary database, within the original data table; and
responsive to an instruction to display a first sub-set of engineering data from within the set of engineering data stored within the temporary database, retrieving the first sub-set of engineering data from the original data table within the temporary database;
storing the first sub-set of engineering data within an internal cache memory that is coupled with the interface control server; and
displaying the first sub-set of engineering data on a display device, wherein the first sub-set of engineering data is retrieved for display, from the internal cache memory,
wherein the interface control server is configured to respond to receiving an instruction for retrieving engineering data from the temporary database, by:
retrieving engineering data from the temporary database;
parsing data within the internal cache memory for identifying any previously stored data rows having a key identifier that matches a key identifier corresponding to a data row within the engineering data retrieved from the temporary database; and
responsive to identifying a previously stored data row within the internal cache memory that has a key identifier that matches a key identifier corresponding to a data row within the engineering data retrieved from the temporary database, retrieving the identified previously stored data row from within the internal cache memory and storing, within the retrieved previously stored data row, one or more data values from within the matched data row from the engineering data retrieved from the temporary database.

12. The system as claimed in claim 11, wherein the interface control server is configured to respond to an instruction to display a second sub-set of engineering data from within the set of engineering data stored within the temporary database, by:
retrieving the second sub-set of engineering data from the original data table within the temporary database;
storing the second sub-set of engineering data within the internal cache memory;
displaying the second sub-set of engineering data on the display device, wherein the second sub-set of engineering data is retrieved for display, from the internal cache memory; and
deleting the first sub-set of engineering data from the internal cache memory.

13. The system as claimed in claim 11, wherein the interface control server is configured such that instantiating the temporary database includes:
instantiating a notification data table within the temporary database and storing notification data retrieved from the engineering data repositories within the notification data table, wherein the notification data correlates a plurality of engineering data records that require to be edited or updated together; or instantiating a reference data table within the temporary database and storing reference data retrieved from the engineering data repositories within the reference data table, wherein the reference data comprises information that enables grouping or ordering of data rows for the purpose of display.

14. The system as claimed in claim 11, wherein the interface control server is configured for implementing:
receiving user input identifying a modification to a data value within a displayed data row that comprises engineering data stored in the internal cache memory;
generating one or more modified data rows based on the received user input and on the engineering data corresponding to the displayed data row that is stored in the internal cache memory;
storing the one or more modified data rows in the internal cache memory; and
responsive to detection of a data synchronization trigger event, initiating a data synchronization operation between the internal cache memory and the temporary database, wherein the data synchronization operation comprises writing data values that have been modified subsequent to an immediately previous data synchronization operation, from the internal cache memory to the modified data table within the temporary database.

15. The system as claimed in claim 11, wherein the interface control server is configured to respond to receiving an instruction for retrieving engineering data from the temporary database in a first data retrieval mode, by:
retrieving engineering data from the original data table based on one or more data retrieval parameters;
identifying a second set of data rows within the modified data table that correspond to a first set of data rows within the engineering data that has been retrieved from the original data table based on the one or more data retrieval parameters;
retrieving the identified second set of data rows from the modified data table;
combining the data values within the first set of data rows and associated data values within the second set of data rows to generate one or more combined data rows; and
storing the generated combined data rows in the internal cache memory for display on the display device.

16. The system as claimed in claim 11, wherein the interface control server is configured to respond to receiving an instruction for retrieving engineering data from the temporary database in a second data retrieval mode, by:
retrieving engineering data from the modified data table based on one or more data retrieval parameters;
identifying a second set of data rows within the original data table that correspond to a first set of data rows within the engineering data that has been retrieved from the modified data table based on the one or more data retrieval parameters;
retrieving the identified second set of data rows from the original data table;

combining the data values within the first set of data rows and associated data values within the second set of data rows to generate one or more combined data rows; and storing the generated combined data rows in the internal cache memory for display on the display device.

17. The system as claimed in claim 11, wherein the interface control server responds to receiving the instruction for retrieving engineering data from the temporary database, by:

responding to a determination that the key identifier corresponding to the data row within the engineering data retrieved from the temporary database does not match key identifier(s) corresponding to any of the previously stored data rows within the internal cache memory, by implementing the steps of:

instantiating a new data row within the internal cache memory; and storing, within the instantiated new data row, the data row within the engineering data that has been retrieved from the temporary database.

18. The system as claimed in claim 11, wherein the interface control server is configured to respond to receiving an instruction for persisting data, by:

identifying one or more modified data rows within the internal cache memory;

storing data values extracted from the identified one or more modified data rows in a corresponding data row within the original data table in the temporary database;

deleting the modified data table in the temporary database; and deleting the identified one or more modified data rows from the internal cache memory.

19. The system as claimed in claim 18, configured such that the step of storing data values extracted from the identified one or more modified data rows in a corresponding data row within the original data table in the temporary database is:

succeeded by the step of storing the data values extracted from the identified one or more modified data rows, in an engineering data repository; or preceded by the step of storing the data values extracted from the identified one or more modified data rows, in an engineering data repository.

20. The system as claimed in claim 11, wherein the interface control server is configured to respond to receiving a predefined trigger instruction by:

checking the amount of free system memory within the interface control server; and responsive to the free system memory being less than a predefined threshold value, generating an insufficient memory alert through the interface control server.

21. A computer program product for managing control system engineering data through a processor implemented interface control server, the computer program product comprising a non-transitory computer usable medium having a computer readable program code embodied therein, the computer readable program code comprising instructions for:

receiving one or more data retrieval parameters for retrieval of engineering data from one or more engineering data repositories;

instantiating a temporary database, wherein instantiating the temporary database includes:

instantiating an original data table within the temporary database; and instantiating a modified data table within the temporary database;

retrieving a set of engineering data from the one or more engineering data repositories based on the one or more data retrieval parameters;

storing the set of engineering data in the original data table in the temporary database; and responsive to an instruction to display a first sub-set of engineering data from within the set of engineering data stored within the temporary database, retrieving the first sub-set of engineering data from the original data table;

storing the first sub-set of engineering data within an internal cache memory that is coupled with the interface control server;

displaying the first sub-set of engineering data from the internal cache memory on a display device;

receiving user input identifying a modification to a data value within a displayed data row that comprises engineering data stored in the internal cache memory;

generating one or more modified data rows based on the received user input and on the engineering data corresponding to the displayed data row that is stored in the internal cache memory;

storing the one or more modified data rows in the internal cache memory; and responsive to detection of a data synchronization trigger event, writing data values that have been modified subsequent to an immediately previous data synchronization operation from the internal cache memory to the modified data table within the temporary database.

* * * * *